US007260895B2

(12) United States Patent
Long et al.

(10) Patent No.: US 7,260,895 B2
(45) Date of Patent: *Aug. 28, 2007

(54) STRUCTURE MOUNTABLE ASSEMBLY

(75) Inventors: Charles Keith Long, Seneca, SC (US); Robert E. McCracken, Aiken, SC (US); Kevin A. Moore, Anderson, SC (US); Charles M. Wacker, Chandler, AZ (US); Lilia F. Macias, Anderson, SC (US); Mark A. Knight, Jackson, MS (US)

(73) Assignee: Eastway Fair Company, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 11/643,363

(22) Filed: Dec. 21, 2006

(65) Prior Publication Data

US 2007/0101594 A1    May 10, 2007

Related U.S. Application Data

(63) Continuation of application No. 11/349,038, filed on Feb. 7, 2006, now Pat. No. 7,174,648, and a continuation-in-part of application No. 10/977,503, filed on Oct. 29, 2004, now Pat. No. 7,191,532, which is a continuation-in-part of application No. 10/919,708, filed on Aug. 17, 2004, now Pat. No. 7,181,854, which is a continuation-in-part of application No. 10/919,569, filed on Aug. 17, 2004, now abandoned.

(51) Int. Cl.
    *G01C 15/00* (2006.01)
(52) U.S. Cl. .................... 33/286; 33/291; 33/DIG. 21

(58) Field of Classification Search .................. 33/283, 33/286, 290–291, 370–371, 347, DIG. 21
See application file for complete search history.

(56) References Cited

U.S. PATENT DOCUMENTS

| 2,600,857 A | 6/1952 | De La Mater |
| 2,615,426 A | 10/1952 | Fryer |
| 2,711,030 A | 6/1955 | Drew et al. |
| 2,992,487 A | 7/1961 | Miller |

(Continued)

FOREIGN PATENT DOCUMENTS

EP    0 977 007 A1    2/2000

(Continued)

*Primary Examiner*—Yaritza Guadalupe-McCall
(74) *Attorney, Agent, or Firm*—Brinks Hofer Gilson & Lione; G. Peter Nichols

(57) ABSTRACT

A modular tool assembly including a tool base configured to releasably secure a modular tool arrangement in a fixed relationship relative to a mounting surface. The tool base includes an upper housing portion and a lower housing portion having a mounting seal extending therefrom. The mounting seal cooperates with the mounting surface to define a vacuum pocket therebetween. A vacuum generating mechanism is configured to remove air from the vacuum pocket through an aperture in the lower housing portion. A modular tool attachment releasably engages a portion of the tool base to secure the modular tool attachment to the tool base. The modular tool attachment can include a self leveling laser leveling device having a laser light source mounted within a housing to project an alignment beam through an opening in the housing to denote a reference plane along the mounting surface.

4 Claims, 17 Drawing Sheets

U.S. PATENT DOCUMENTS

| | | | |
|---|---|---|---|
| 3,489,324 | A | 1/1970 | Stohl |
| 3,675,886 | A | 7/1972 | Kampmier |
| 3,724,953 | A | 4/1973 | Johnston, Jr. |
| 3,897,637 | A | 8/1975 | Genho |
| 4,063,365 | A | 12/1977 | Hopkins et al. |
| 4,225,106 | A | 9/1980 | Eplan |
| 4,703,563 | A | 11/1987 | Hoshino et al. |
| 4,852,265 | A | 8/1989 | Rando et al. |
| 4,853,617 | A | 8/1989 | Douglas et al. |
| 4,907,769 | A | 3/1990 | Hunley et al. |
| 4,912,851 | A | 4/1990 | Rando et al. |
| 4,924,597 | A | 5/1990 | Tursi |
| 4,992,741 | A | 2/1991 | Douglas et al. |
| 5,063,679 | A | 11/1991 | Schwandt |
| 5,075,977 | A | 12/1991 | Rando |
| 5,144,487 | A | 9/1992 | Hersey |
| 5,182,863 | A | 2/1993 | Rando |
| 5,218,770 | A | 6/1993 | Toga |
| 5,253,421 | A | 10/1993 | Landmark |
| 5,287,627 | A | 2/1994 | Rando |
| 5,352,974 | A | 10/1994 | Heger |
| 5,366,129 | A | 11/1994 | Nakamura et al. |
| 5,394,616 | A | 3/1995 | Claxton |
| 5,400,514 | A | 3/1995 | Imbrie et al. |
| 5,459,932 | A | 10/1995 | Rando et al. |
| 5,519,942 | A | 5/1996 | Webb |
| 5,524,352 | A | 6/1996 | Rando et al. |
| 5,531,031 | A | 7/1996 | Green |
| 5,541,727 | A | 7/1996 | Rando et al. |
| 5,552,886 | A | 9/1996 | Kitajima et al. |
| 5,584,458 | A | 12/1996 | Rando |
| 5,594,993 | A | 1/1997 | Tager et al. |
| 5,610,711 | A | 3/1997 | Rando |
| 5,617,202 | A | 4/1997 | Rando |
| 5,617,645 | A | 4/1997 | Wick et al. |
| 5,619,128 | A | 4/1997 | Heger |
| 5,619,802 | A | 4/1997 | Rando et al. |
| 5,621,975 | A | 4/1997 | Rando |
| 5,630,517 | A | 5/1997 | Maznik |
| 5,655,307 | A | 8/1997 | Ogawa et al. |
| 5,713,135 | A | 2/1998 | Acopulos |
| 5,748,306 | A | 5/1998 | Louis |
| 5,773,721 | A | 6/1998 | Bashyam |
| 5,795,001 | A | 8/1998 | Burke |
| 5,819,424 | A | 10/1998 | Ohtomo et al. |
| 5,829,152 | A | 11/1998 | Potter et al. |
| 5,842,282 | A | 12/1998 | Ting |
| 5,859,693 | A | 1/1999 | Dunne et al. |
| 5,864,956 | A | 2/1999 | Dong |
| 5,872,657 | A | 2/1999 | Rando |
| 5,894,675 | A | 4/1999 | Cericola |
| 5,900,931 | A | 5/1999 | Rando |
| 5,905,455 | A | 5/1999 | Heger et al. |
| 5,917,314 | A | 6/1999 | Heger et al. |
| 5,917,587 | A | 6/1999 | Rando |
| D412,674 | S | 8/1999 | Kaiser |
| D412,857 | S | 8/1999 | Howard et al. |
| 5,949,529 | A | 9/1999 | Dunne et al. |
| 5,956,861 | A | 9/1999 | Barnes |
| D415,436 | S | 10/1999 | Martone |
| 5,999,346 | A | 12/1999 | Grundstrom et al. |
| 6,005,719 | A | 12/1999 | Rando |
| D418,432 | S | 1/2000 | Krantz |
| D418,434 | S | 1/2000 | Krantz |
| D418,763 | S | 1/2000 | Krantz |
| D419,149 | S | 1/2000 | Krantz et al. |
| D419,544 | S | 1/2000 | Krantz |
| D419,545 | S | 1/2000 | Krantz et al. |
| D419,546 | S | 1/2000 | Krantz et al. |
| 6,009,630 | A | 1/2000 | Rando |
| 6,012,229 | A | 1/2000 | Shiao |
| D420,972 | S | 2/2000 | Brecher et al. |
| 6,023,159 | A | 2/2000 | Heger |
| 6,030,091 | A | 2/2000 | Li |
| 6,035,540 | A | 3/2000 | Wu et al. |
| 6,037,874 | A | 3/2000 | Heironimus |
| 6,065,217 | A | 5/2000 | Dong |
| 6,067,152 | A | 5/2000 | Rando |
| D427,166 | S | 6/2000 | Krantz |
| 6,073,353 | A | 6/2000 | Ohtomo et al. |
| 6,137,564 | A | 10/2000 | Schmidt et al. |
| 6,157,591 | A | 12/2000 | Krantz |
| 6,163,969 | A | 12/2000 | Jan et al. |
| 6,178,655 | B1 | 1/2001 | Potter et al. |
| 6,198,271 | B1 | 3/2001 | Heger et al. |
| 6,202,312 | B1 | 3/2001 | Rando |
| 6,209,219 | B1 | 4/2001 | Wakefield et al. |
| 6,211,662 | B1 | 4/2001 | Bijawat et al. |
| 6,215,293 | B1 | 4/2001 | Yim |
| 6,219,931 | B1 | 4/2001 | Roth |
| 6,223,446 | B1 | 5/2001 | Potter |
| 6,249,113 | B1 | 6/2001 | Krantz et al. |
| 6,259,241 | B1 | 7/2001 | Krantz |
| 6,262,801 | B1 | 7/2001 | Shibuya et al. |
| 6,301,997 | B1 | 10/2001 | Welte |
| 6,351,890 | B1 | 3/2002 | Williams |
| 6,360,446 | B1 | 3/2002 | Bijawat et al. |
| D455,430 | S | 4/2002 | Krantz |
| D455,750 | S | 4/2002 | Krantz |
| 6,382,574 | B1 | 5/2002 | Pando |
| D461,135 | S | 8/2002 | Watson et al. |
| 6,427,347 | B1 | 8/2002 | Butler, Sr. |
| D464,578 | S | 10/2002 | Zurwelle |
| 6,493,952 | B1 | 12/2002 | Kousek et al. |
| D469,556 | S | 1/2003 | Malard et al. |
| 6,502,319 | B1 | 1/2003 | Goodrich et al. |
| D470,423 | S | 2/2003 | Loudenslager et al. |
| 6,532,675 | B2 | 3/2003 | Letourneau |
| 6,532,676 | B2 | 3/2003 | Cunningham |
| D474,985 | S | 5/2003 | Cooper et al. |
| D475,938 | S | 6/2003 | Lopano |
| 6,577,388 | B2 | 6/2003 | Kallabis |
| 6,581,296 | B2 | 6/2003 | Ponce |
| D476,584 | S | 7/2003 | Zurwelle |
| 6,593,754 | B1 | 7/2003 | Steber et al. |
| 6,594,910 | B2 | 7/2003 | Wishart |
| 6,606,798 | B2 | 8/2003 | El-Katcha et al.. |
| 6,612,714 | B1 | 9/2003 | Morre et al. |
| 6,625,895 | B2 | 9/2003 | Tacklind et al. |
| 6,640,456 | B2 | 11/2003 | Owoc et al. |
| 6,674,276 | B2 | 1/2004 | Morgan et al. |
| 6,829,834 | B1 | 12/2004 | Krantz |
| 6,880,256 | B2 | 4/2005 | Helms |
| 6,964,545 | B1 | 11/2005 | Languasco |
| 2001/0007420 | A1 | 7/2001 | Bijawat et al. |
| 2001/0029675 | A1 | 10/2001 | Webb |
| 2001/0034944 | A1 | 11/2001 | Cunningham |
| 2001/0049879 | A1 | 12/2001 | Moore |
| 2001/0053313 | A1 | 12/2001 | Luebke |
| 2002/0017028 | A1 | 2/2002 | Wishart |
| 2002/0059735 | A1 | 5/2002 | Ponce |
| 2002/0069543 | A1 | 6/2002 | Owoc et al. |
| 2002/0073561 | A1 | 6/2002 | Liao |
| 2002/0152621 | A1 | 10/2002 | Letourneau |
| 2002/0162233 | A1 | 11/2002 | El-Katcha et al. |
| 2002/0166249 | A1 | 11/2002 | Liao |
| 2002/0178596 | A1 | 12/2002 | Malard et al. |
| 2002/0193964 | A1 | 12/2002 | Hsu |
| 2003/0061720 | A1 | 4/2003 | Waibel |
| 2003/0101605 | A1 | 6/2003 | Tacklind et al. |
| 2003/0131491 | A1 | 7/2003 | Weeks |
| 2003/0201783 | A1 | 10/2003 | Steber et al. |
| 2003/0218469 | A1 | 11/2003 | Brazell et al. |
| 2003/0231303 | A1 | 12/2003 | Raskin et al. |

| | | | | | | |
|---|---|---|---|---|---|---|
| 2004/0000918 A1 | 1/2004 | Sanoner et al. | | 2006/0037203 A1 | 2/2006 | Long et al. |
| 2004/0004825 A1 | 1/2004 | Malard et al. | | | | |
| 2004/0031163 A1 | 2/2004 | El-Katcha et al. | | | | |

FOREIGN PATENT DOCUMENTS

| | | | |
|---|---|---|---|
| 2004/0205972 A2 | 10/2004 | Wu | |
| 2004/0250432 A1 | 12/2004 | Krantz | |
| 2005/0022399 A1 | 2/2005 | Wheeler et al. | |
| 2005/0066533 A1 | 3/2005 | Wheeler et al. | |
| 2005/0155238 A1 | 7/2005 | Levine et al. | |
| 2005/0198845 A1 | 9/2005 | Robinson | |
| 2005/0206891 A1 | 9/2005 | Khubani | |
| 2005/0274030 A1 | 12/2005 | Spanksi et al. | |
| 2006/0016083 A1 | 1/2006 | Huang | |

| | | |
|---|---|---|
| EP | 0 981 037 A1 | 2/2000 |
| EP | 1 235 051 A2 | 8/2003 |
| EP | 1 357 353 A2 | 10/2003 |
| EP | 1 367 364 A2 | 12/2003 |
| EP | 1 367 365 A2 | 12/2003 |
| EP | 1 367 366 A2 | 12/2003 |
| EP | 1 376 054 A1 | 2/2004 |
| GB | 2 383 138 A | 6/2003 |
| GB | 2 389 194 A | 12/2003 |
| GB | 2 390 498 A | 1/2004 |

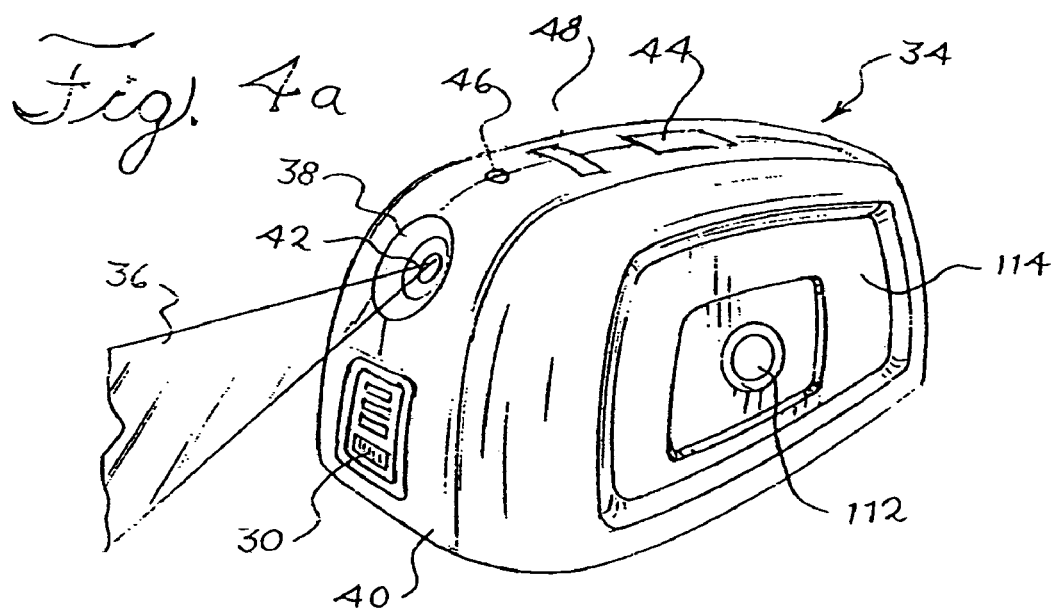
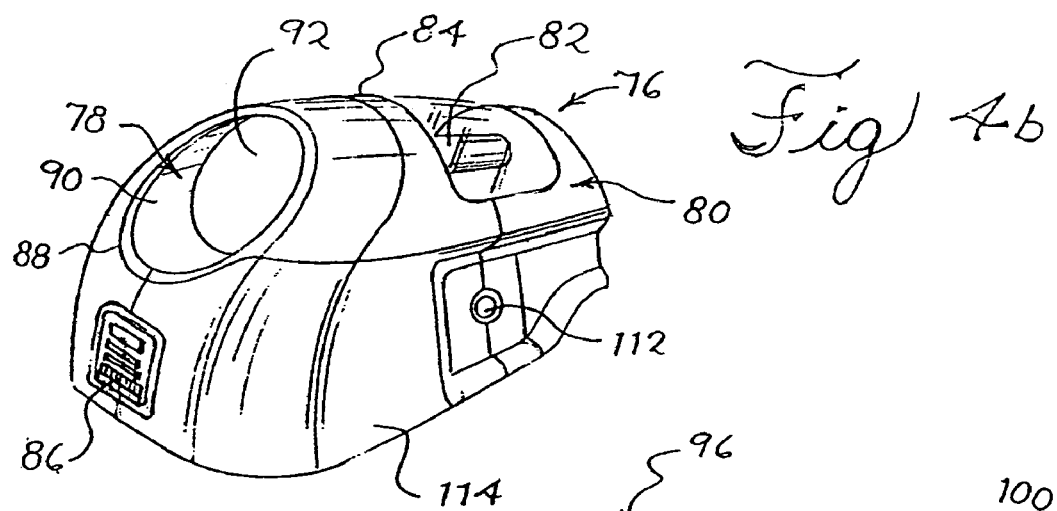
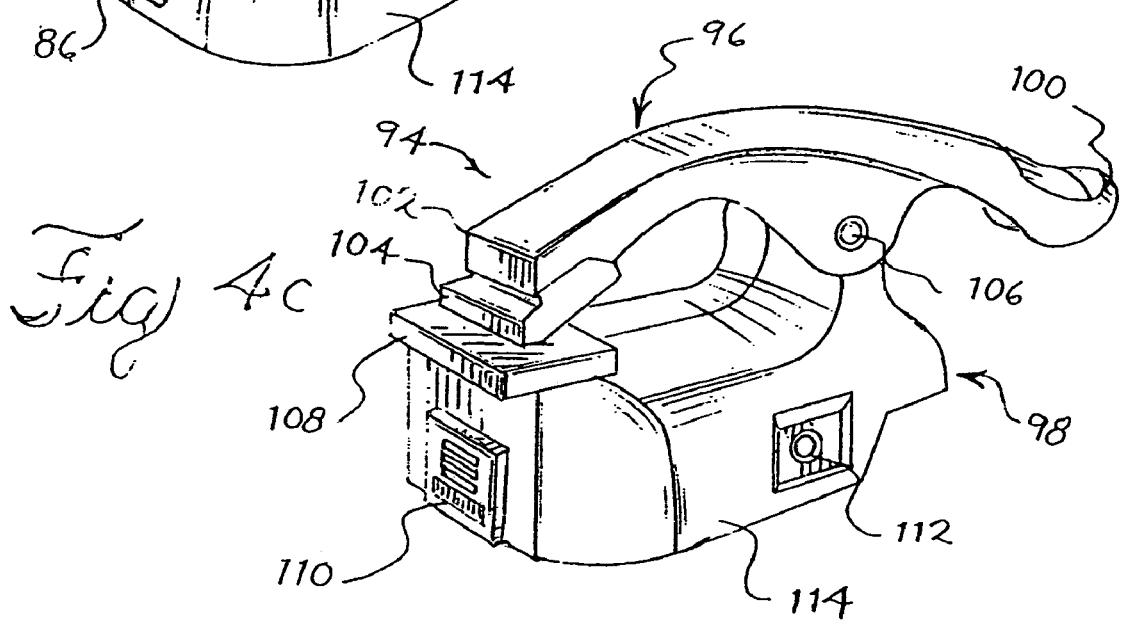

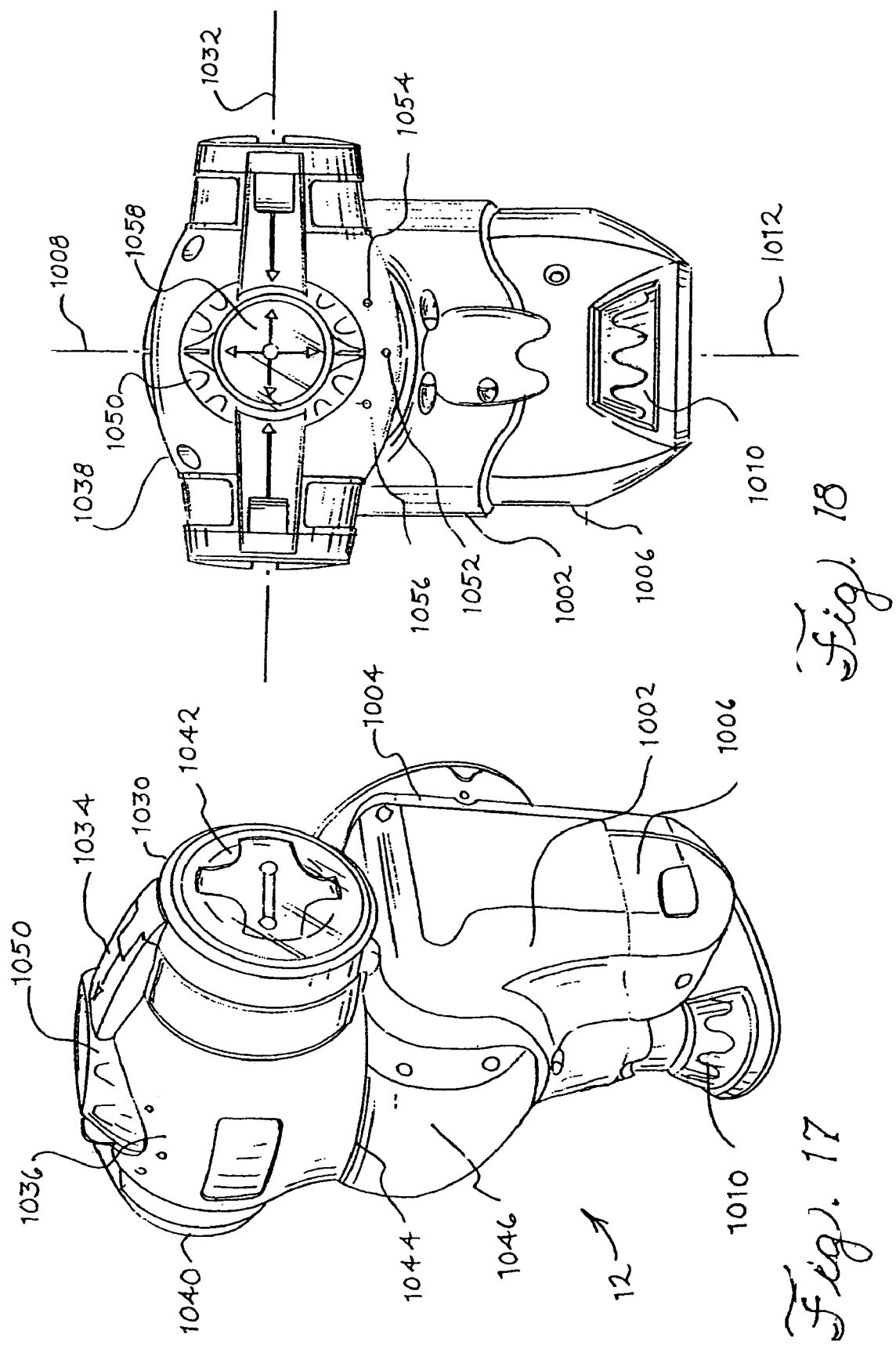

STRUCTURE MOUNTABLE ASSEMBLY

This application is a continuation of U.S. Ser. No. 11/349,038 filed Feb. 7, 2006 now U.S. Pat. No. 7,174, 648, which is a continuation-in-part of U.S. Ser. No. 10/919,708 filed Aug. 17, 2004 now U.S. Pat. No. 7,181,854, and which is a continuation-in-part of U.S. Ser. No. 10/977,503 filed Oct. 29, 2004 now U.S. Pat. No. 7,191,532, which is a continuation-in-part of U.S. Ser. No. 10/919,569 filed Aug. 17, 2004 now abandoned, of which the entire contents all are incorporated herein by reference.

BACKGROUND

This invention relates to a modular assembly having a base incorporating a mounting arrangement for securing a modular tool assembly to a mounting surface.

Suction mounting devices are frequently coupled to tools utilized for transporting materials between locations or attaching devices to surfaces. Battery powered suction devices are typically used in the construction and assembly industries. For example, auto workers frequently use hand held suction devices to manipulate panes of automotive glass between assembly locations.

Therefore, it is desirable to provide a modular assembly having a base incorporating a vacuum mounting arrangement that is configurable to support a tool assembly including a variety of tools, such as hooks, clamps, light sources, battery powered tools, laser leveling devices and similar devices. It is also desirable to provide a modular assembly having a vacuum mounting arrangement that can be easily mounted to a mounting surface without damaging the finish of the surface. It is further desirable to provide a monitor to monitor the vacuum seal to ensure proper securement of the assembly to the mounting surface.

Recently, power tool manufacturers have developed common battery arrangements that support a variety of power tools sold in a combination package. Such kits may include tools such as drills, saws, and flashlights. Manufacturers are interested in adding laser alignment products, such as laser levels to these kits. Laser levels have replaced chalk lines and torpedo levels as the preferred tool for creating and displaying a level line on a surface. These tools are commonly used for interior decorating projects, such as hanging pictures and installing cabinetry, and exterior projects, such as brick laying and deck assembly.

Laser levels are easy to set up and generate an alignment beam which does not mark up the mounting surface. Current laser level products are either mounted to an adjustable frame or are secured to a mounting surface with a fastener. Laser levels typically include a laser light source mounted within a housing. One limitation of current laser alignment devices is that the laser level cannot be easily repositioned on surfaces once mounted. Many laser level devices either incorporate a pin or a fastener to mount the level on a vertical surface to generate the alignment line. If the laser level is not properly aligned on the wall, a user will have to remove the device and remount in the proper position, placing additional marks and holes on the surface which must be patched.

BRIEF SUMMARY

Accordingly, the present invention provides a modular tool assembly having a vacuum mounting arrangement for securing the assembly to a mounting surface. The modular tool assembly includes a base having upper and lower housing portions. A mounting seal extending from a lower portion of the housing cooperates with the mounting surface to define a suction mounting area therebetween. An upper housing portion may include a guide member having one or more receiving portions formed therein. Alternatively, the housing portion may be provided with a mounting element to mate with a complementary mounting element of a modular tool attachment.

A vacuum generating mechanism is disposed within the assembly, for example in the upper housing portion (although it could be provided in the lower housing portion). In one embodiment, the vacuum generating mechanism is electrically connected to a power source (which may include a rechargeable power source). In this embodiment, the vacuum generating mechanism includes a motor and a pump operatively driven by the motor and configured to remove air from the suction mounting area. In one aspect, the air may be removed through an aperture in the lower portion of the tool base to secure the housing to the mounting surface. A sensor may be mounted proximate an aperture in the lower housing portion of the tool base. The sensor monitors the suction mounting area and activates the pump if the sensor detects a loss of pressure in the suction mounting area.

A switch that may be disposed on the upper portion of the tool base housing or elsewhere is operatively connected to the vacuum generating mechanism allows a user to activate the vacuum generating mechanism. At least one electrical connector may be provided in, for example, a top surface of the upper portion of the tool base housing to electrically connect the power source to a modular tool attachment.

A modular tool is releasably secured to a portion of the housing of the tool base. The modular tool may include a modular tool attachment that can be mounted on the base in a fixed relationship relative to the mounting surface. The modular tool attachment may include one or more projections extending from a tool attachment housing that releasably engages one or more receiving portions in a portion of the tool base. Alternatively, the tool attachment housing may have a complementary mounting element that cooperates with a mounting element provided on the housing to releasably secure the tool attachment housing to the base.

In one aspect of the present invention, the vacuum generating mechanism includes a manually operable pump cooperating with the suction mounting area to remove air from the suction mounting area. In one aspect, the air may be removed through an aperture in the housing to secure the base to the mounting surface. In an alternative embodiment the vacuum generating mechanism includes a lever to actuate a vacuum pad and create an air pocket or suction between the device and the surface on which the device is mounted.

In another aspect of the invention, the modular tool comprises a laser leveling device having a housing, a laser light source disposed within the housing operatively connected to a power source, the laser light source including at least one diode projecting an alignment beam through an aperture in the housing to denote a reference plane along the mounting surface. One or more bubble levels or other devices for indicating level may be provided on the laser level housing. The modular tool may also comprise a flashlight, a clamp, a tape measure or other measuring device, a tool holder (such as a driver bit holder), an alignment device, a hook, powered (including battery powered) and non-powered tools.

Alternatively, the assembly can be in the form of a laser leveling device having a suction mounting arrangement that comprises a housing and a mounting seal extending from the lower portion of the housing. The mounting seal extends around a cavity in the lower portion of the housing and cooperates with an attachment surface to define a suction mounting area therebetween. A power source is provided within the housing. In one aspect of the present invention, the power source comprises a removably mounted battery or power cell. In another aspect of the invention, the power source is a rechargeable power cell securely mounted within the housing.

The laser leveling device includes a suction mounting arrangement configured to secure the laser leveling device to an attachment surface. A first aspect of the suction mounting arrangement includes a vacuum generating mechanism disposed within the laser level housing which evacuates air from the suction mounting area. The vacuum generating mechanism includes a motor connected to the power source and a pump operatively driven by the motor. A sensor disposed proximate the cavity monitors the vacuum seal in the suction mounting area and activates the pump if the sensor detects a loss of pressure. The pump is configured to remove air from the suction mounting area through an aperture in the cavity to ensure the laser level housing is secured to the attachment surface.

A second aspect of the suction mounting arrangement for the laser leveling device includes a manually operable pump cooperating with the suction mounting arrangement to secure the laser level to an attachment surface. The suction mounting arrangement comprises a manually operable pump cooperating with the mounting seal and configured to remove air from the suction mounting area through an aperture in the housing to secure the housing to the attachment surface.

A third aspect of the suction mounting arrangement includes a lever to actuate a vacuum pad and create an air pocket or suction between the device and the surface on which the device is mounted.

A laser light source is mounted within the housing in a fixed relationship relative to the attachment surface and is operatively connected to the power source. The laser light source includes at least one diode projecting an alignment beam through an opening in the housing to denote a reference plane along the attachment surface. A lens is mounted in an end wall of the housing and cooperates with the at least one diode to project an alignment beam along the attachment surface.

In one aspect of the invention, the laser light source includes a pair of opposing diodes positioned in a coplanar relationship which project alignment beams through opposing end walls of the laser level housing. In another aspect of the invention, the laser light source comprises a first diode projecting a first alignment beam through an opening in the end wall of the housing and a second diode projecting a second alignment beam generally perpendicular to the first alignment beam through an opening in a side wall of the housing.

The laser level housing includes a handle formed in a top portion of the housing. A pump actuation switch is provided on a side wall of the housing adjacent the handle. The pump actuation switch cooperates with the vacuum generating mechanism or manual pump when the laser level is positioned on the attachment surface to evacuate air from the suction mounting area. A switch extends through the housing allowing a user to activate the laser light source when the laser level is mounted to the attachment surface.

BRIEF DESCRIPTION OF THE DRAWINGS

FIG. 4a is a perspective view of the laser leveling modular tool attachment configured for coupling to the modular tool assembly;

FIG. 4b is a perspective view of a flashlight modular tool attachment configured for coupling to the modular tool assembly; and FIG. 4c is a perspective view of a clamp modular tool attachment configured for coupling to the modular tool assembly.

FIG. 17 is a perspective view of another embodiment of modular tool assembly of the present invention having a laser generator housing.

FIG. 18 is a front view of the tool assembly of FIG. 17 with the laser generator housing pivoted in a forward position and with internal details of the base being visible.

DESCRIPTION

Figure 1:
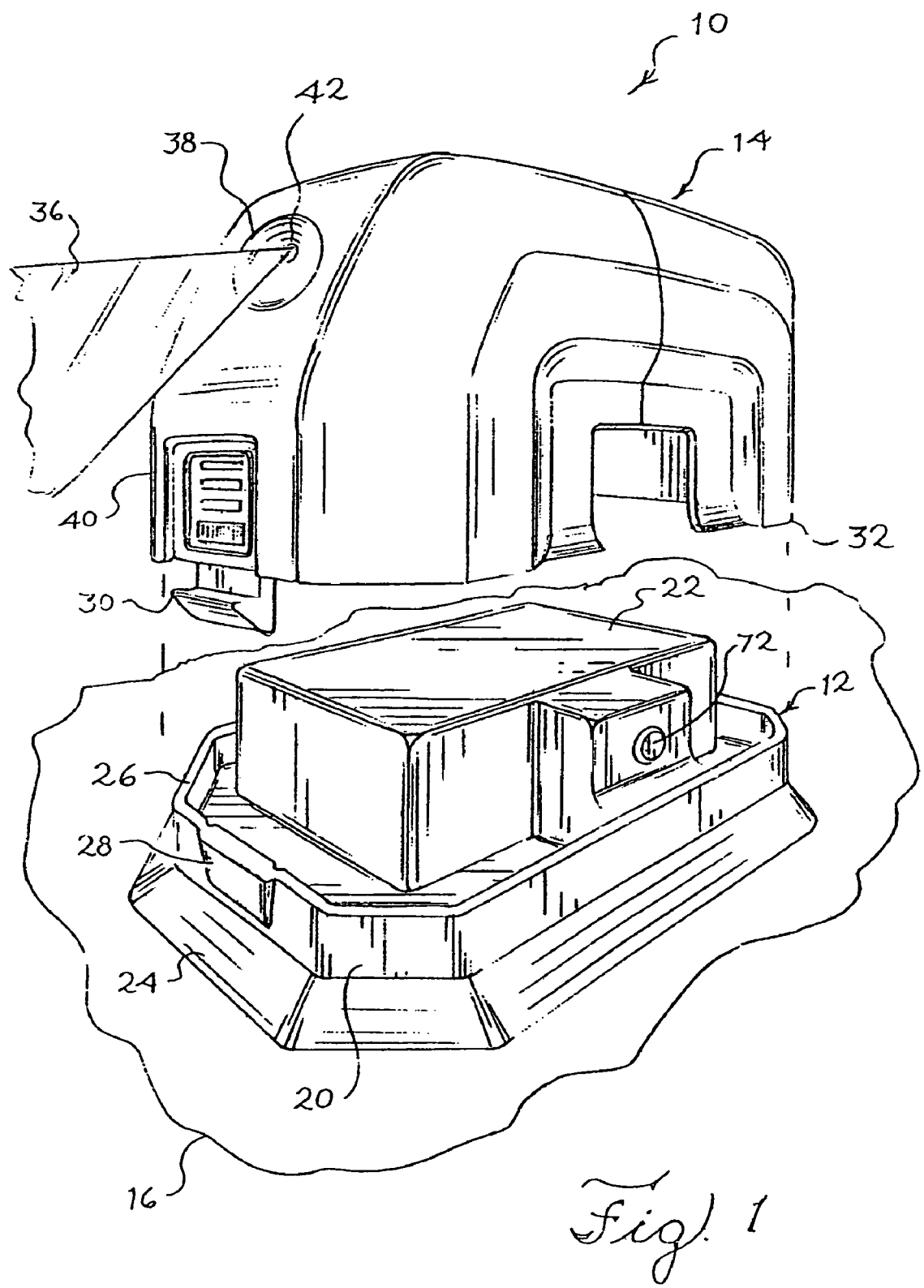
FIG. 1 is an exploded perspective view of the modular tool assembly having a modular tool attachment releasably secured to a tool base in accordance with the present invention.
Figure 2:
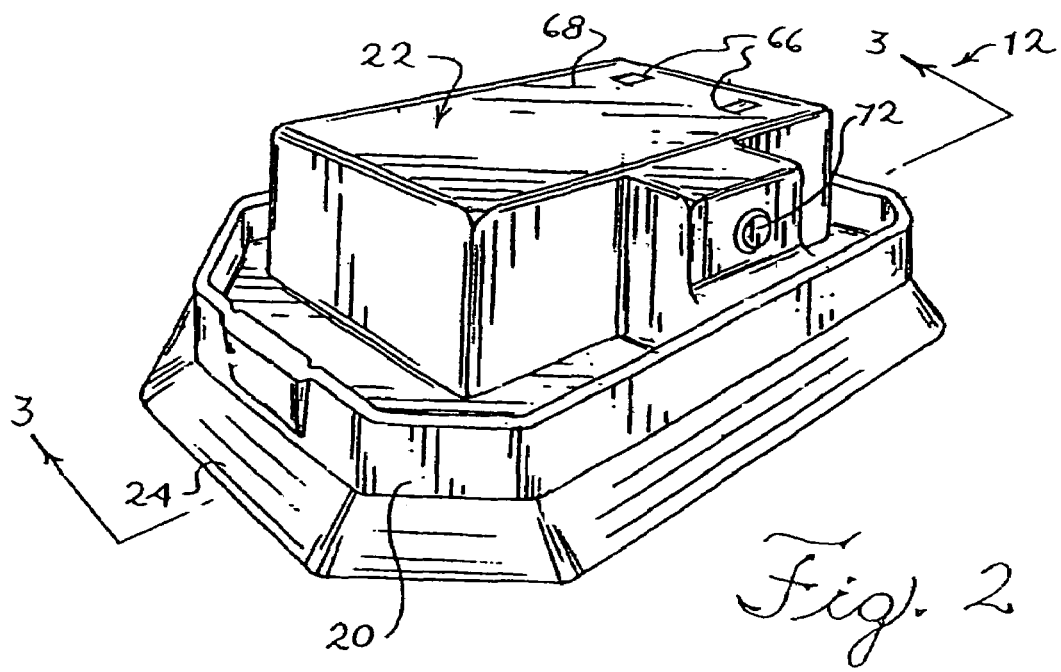
FIG. 2 is a perspective view of the tool base of the modular tool assembly in accordance with the present invention.

Referring now to FIGS. 1 and 2, a modular tool assembly 10 configurable to releasably secure a variety of portable tools, including powered and non-powered tools, is disclosed. Modular tool assembly 10 includes a tool base 12 incorporating a vacuum mounting arrangement for securing the tool base 12 and a removably mounted modular tool attachment 14 to a mounting surface 16. Tool base 12 includes a housing 18 having a lower portion 20 and an upper portion 22. A suction cup or mounting seal 24 extends from the lower housing portion 20.

A guide member 26 extends generally vertically from the lower housing portion 20 to provide an outer mounting guide for modular tool attachment 14. One or more receiving portions 28 are formed in the guide member 26 to receive and secure one or more connecting arms or projections 30 extending from the modular tool attachment 14. The guide member 26 cooperates with the tool housing 32 of the modular tool attachment 14 to position and secure the tool attachment 14 on the tool base 12.

Referring now to FIGS. 1 and 4a, the modular tool attachment is a laser leveling device 34 adapted for attachment to the modular tool base 12. A laser light source (not shown) is mounted with the housing 32. The laser light source includes at least one diode (not shown) which projects one or more alignment beams 36 through an opening 38 in an end wall 40 of the housing 32. In one aspect of the present invention, a lens 42 is provided in the opening 38 to cooperate with at least one diode to focus the alignment beam 36. However, it is understood that the alignment beam 36 may project through a standard opening in the housing 32 to denote a reference plane along the mounting surface 16.

In one aspect of the present invention, the laser light source is rotatably mounted within the housing 32 to allow a user to adjust the position of the laser light source once the laser level attachment 34 is placed in a fixed relationship to the mounting surface 16 when mounted on the tool base 12. It is understood, however, that the laser light source may be fixedly mounted to a portion of the housing. It is also contemplated that the attachment 34 be mounted to the modular tool base 12 in a manner that allows the attachment 34 to be selectively pivoted with respect to the tool base. Desirably, the attachment 34 can be selectively pivoted in a manner such that the projected beam can be at a selected angle from the vertical or horizontal.

It is also contemplated that laser level attachment may include a laser light source having a pair of diodes in a coplanar relationship which project alignment beams through openings in opposing end walls of the laser level housing. Further, the laser light source may include a first diode which projects a first alignment beam through a first opening in the end or side wall of the housing and a second diode projecting a second alignment beam generally perpendicular to the first alignment beam through a second opening in an end or side wall of the housing.

One or more bubble levels 44 can be provided such as along the top portion 46 of the laser leveling device housing 32. The bubble levels 44, 48 assist the operator in positioning the laser level attachment 34 mounted on the tool base 12 to the mounting surface 16 to ensure that the alignment beam 36 projects across the surface 16 at the desired angle. In one aspect of the invention shown in FIG. 4a, a pair of bubble levels 44, 48 are provided on the top portion 46 of the laser level housing 32 to provide both horizontal and vertical alignment information to the operator prior to securement of tool assembly 10 to mounting surface 16. It is understood that a single bubble level disposed on the laser level housing may also be used to display the alignment position of the modular tool assembly.

Figure 3:
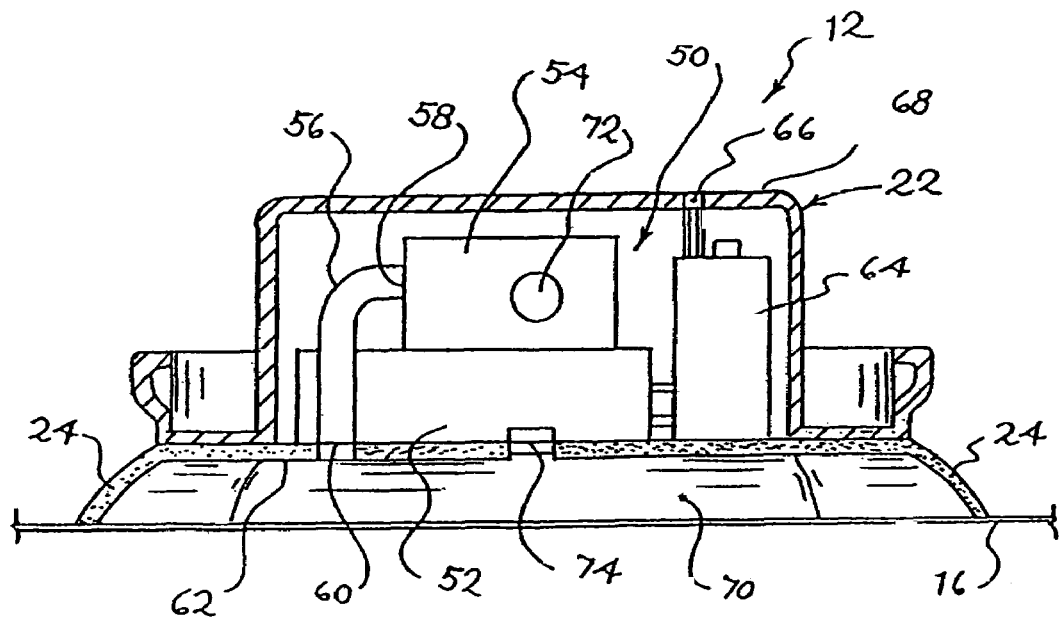
FIG. 3 is a cross-sectional view of the tool base along line 3-3 of FIG. 2.

Referring now to FIGS. 2 and 3, a vacuum generating mechanism 50 is disposed within the tool base 12 to create a suction effect to secure the tool base 12 to the mounting surface 16. In one embodiment, the vacuum generating mechanism 50 includes a motor 52 and a vacuum pump 54 operatively connected to the motor 52 disposed within the upper housing portion 22. It is understood that the motor 52 and the pump 54 may be formed as a single unit. A hose 56 connects an inlet 58 on the pump 54 to an aperture 60 in the bottom surface 62 of the lower housing portion 20. Air is drawn through the aperture 60 by the pump 54.

A power source 64 disposed within the upper housing portion 22 is electrically connected to the motor 52. The power source 64 may include a rechargeable battery pack, such as a lithium ion or nickel cadmium battery, or removable rechargeable or alkaline battery. In one aspect of the present invention, one or more electrical contacts 66 in electrical communication with the power source 64 extend through a top surface 68 of the upper housing portion 22 to supply power to the modular tool attachment 14. It is also contemplated that the modular tool attachment 14 may include an independent power source.

The motor 52 and the pump 54 of the vacuum generating mechanism 50 cooperate with the mounting seal 24 to create a vacuum pocket or suction mounting area 70 between the mounting surface 16, the mounting seal 24, and the bottom surface 62 of the lower housing portion 20 of the tool base 12.

The mounting seal 24 is preferably a rubber suction cup that cooperates with the mounting surface 16 to define a vacuum pocket 70 therebetween. In one aspect of the present invention, the bottom surface 62 of the lower housing portion 20 is arcuately shaped to form a cavity cooperating with the mounting seal 24 and the mounting surface 16 to enhance the suction effect created in the vacuum pocket 70. In this aspect, the modular tool attachment 14 and, in particular, the mounting seal 24, is placed into contact with a mounting surface 16 and pressed against the mounting surface to evaluate air from the vacuum pocket 70.

In another aspect of the present invention, air is removed from the vacuum pocket 70 by a pump. In one alternative, a switch 72 disposed on the upper housing portion 22 is operatively connected to the pump 54 to allow a user to activate the pump 54 to remove air from the vacuum pocket 70. The switch 72 may also control electrical contacts 66 supplying power to a device in the modular tool attachment 14, thereby controlling the activation of both the pump 54 of the vacuum generating mechanism 50 and the modular tool attachment 14. Alternatively, the modular tool attachment 14 may incorporate a switch that will independently operate the modular tool attachment.

Once the user places the mounting seal 24 of the tool base 12 in contact with a mounting surface 16, the user actuates the switch 72, which activates the pump 54. The pump 54 evacuates air from the vacuum pocket 70 through the inlet 60. A sensor 74 disposed in the bottom surface 62 of the lower housing portion 20 monitors the vacuum pocket 70. The sensor 74 activates the pump 54 to remove air from the vacuum pocket 70 if the sensor detects a loss of pressure in the vacuum pocket 70. Loss of vacuum pressure may be caused by imperfections in the mounting surface 16 or the seal 24 such as gaps or cracks that limit the effectiveness of the mounting seal 24. The sensor 74 allows the pump 54 to compensate for the surface flaws to ensure a proper seal between the tool base 12 and the mounting surface 16.

Figure 5:
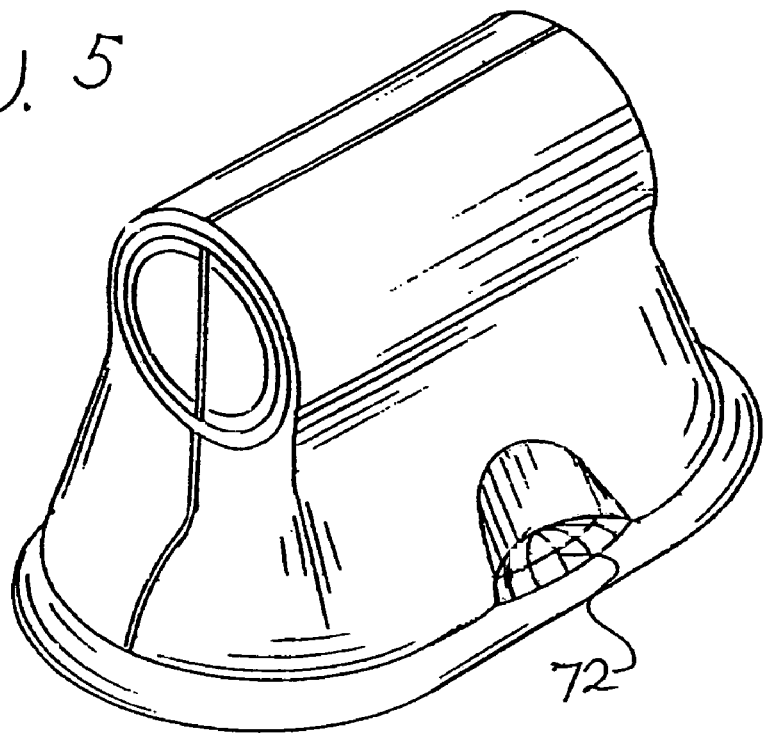
FIG. 5 is a perspective view of one embodiment of the modular tool assembly having a modular tool attachment wherein the modular tool assembly has a manually operable vacuum attachment.
Figure 6:
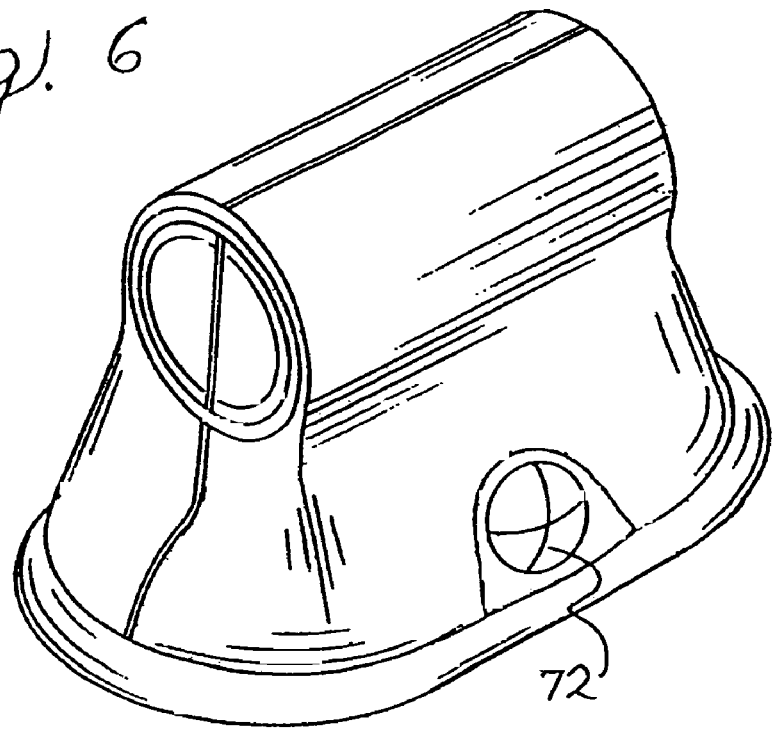
FIG. 6 is a perspective view of an embodiment similar to that shown in FIG. 5 except that the manual pump is shown in a different location.

A third aspect of the vacuum generating mechanism includes a manually operable pump cooperating with the mounting seal 24 to remove air from the vacuum pocket 70. A switch 72a may be placed on either the lower portion 20 or the upper portion 22 of the tool base as shown in FIGS. 5 and 6. The switch 72a may simply function to evacuate air from the vacuum pocket 70 when activated, such as by depressing the switch. Alternatively, the switch 72a may operate the pump such that when the switch 72a is depressed, air is evacuated from the vacuum pocket.

Referring now to FIG. 4b, a second modular tool attachment is disclosed. In this instance, the modular tool attachment comprises a flashlight 76 having a flashlight head 78 and a flashlight body 80 configured for securement to the tool base 12. The flashlight body 80 includes a handle 82 formed in a top surface 84 of the body 80. One or more connecting arms 86 extend from the flashlight body 80 to releasably engage one or more receiving portions 28 in the guide member 26 of the tool base 12. Alternatively, the upper portion 22 such as the top surface 60 or elsewhere may be provided with a mounting element to engage a complementary mounting element on the flashlight body 80. For example, the mounting element may include a magnetic surface, a hook, or a complementary portion of a hook-and-loop type fastener, mating ribs, and other mounting elements well known in the art. The flashlight head 78 includes a shroud 88, a reflector 90 and a lens 92 mounted adjacent a bulb (not shown). The vacuum generating mechanism incorporated in the tool base 12 allows hands-free use of the flashlight 76 when mounted on a mounting surface 16.

Referring now to FIG. 4c, a third modular tool attachment for the modular tool assembly of the present invention is disclosed. The third modular tool attachment comprises a clamp 94 having a handle 96 pivotally attached to a clamp housing 98. The handle 96 includes a distal end forming a handle portion 100 to be grasped by a user and an opposed gripping portion 102 including an elongate jaw 104 provided thereon. The handle 96 pivots about a spring biased mount 106 disposed in the clamp housing 98. The clamp housing 98 includes a generally horizontal jaw 108 cooperating with a jaw 104 on the handle 96 to secure a workpiece therebetween. The clamp housing 98 includes one or more projections 110 that releasably engage one or more receiving portions in guide member 26 of tool base 12. As with the flashlight 76, the clamp housing 98 may be mounted to the upper portion 22 by engagement with a mounting element provided on the upper portion 22.

Referring now to FIGS. 1 and 4a-4c, a switch 112 provided in a wall of 114 of the respective modular tool attachment embodiments may cooperate with a switch 72 on the modular tool base 12 to activate the pump 54 of vacuum generating mechanism 50 to mount the modular tool base 10 to the mounting surface 16. As described above, it is understood that the switch 72 may activate the laser light source of laser leveling device 34, the bulb of flashlight head 78 of flashlight 76, or to activate another modular tool attachment. Alternatively, the switch 112 may only activate the vacuum generating mechanism 50 while an independent switch operates the features of the modular tool attachments.

Figure 7:
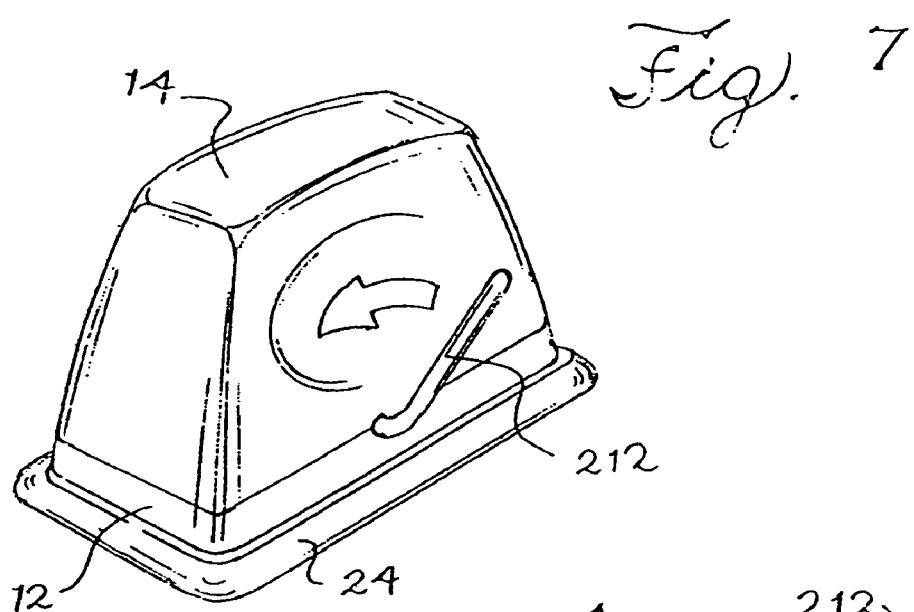
FIG. 7 is a perspective view of one embodiment of a modular tool assembly having a manually operable vacuum attachment.
Figure 8:
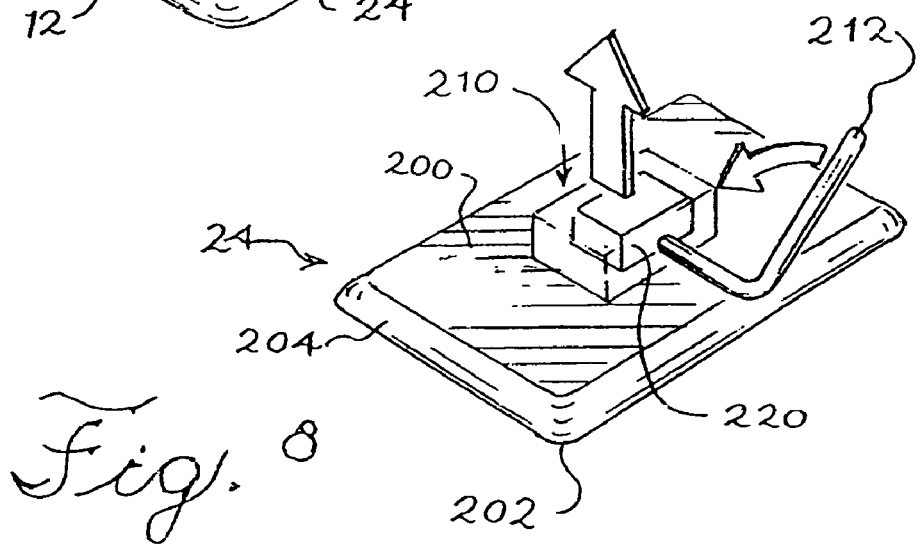
FIG. 8 is a perspective view of the manually operable vacuum attachment for use with the assembly of FIG. 7 and with the modular tool assembly and the base removed.
Figure 9:
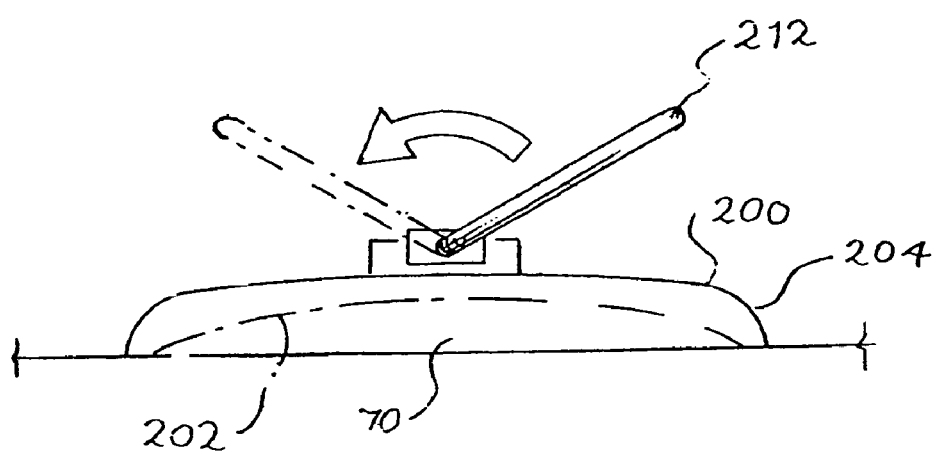
FIG. 9 is a side perspective view of the manually operable vacuum attachment for use with the assembly of FIG. 7, with the modular tool assembly removed, and schematically showing operation of the lever and the vacuum pad.

Referring now to FIGS. 7-9, another embodiment of the device of the present invention having a manual suction mounting arrangement is shown. In this embodiment, the base 12 having a mounting seal 16 is as described above with other alternative embodiments. The mounting seal 16 is provided with a top surface 200, a bottom surface 202 and a wall 204 extending from the top surface 200 to contact the attachment surface 16 and form a seal, as will be described below.

A lifting mechanism 210 provided on the top surface 200 of the mounting seal cooperates with the bottom surface 202 such that actuation of the lifting mechanism 210 lifts the bottom surface 202 to create a cavity 70. The lifting mechanism 210 can be provided with a lever 212 that extends from a portion of the tool base 12 such that movement of the lever 212 actuates the lifting mechanism 210. As shown in FIGS. 7-9, the lever 212 is rotated from a first position to a second position (counter clockwise direction) such that in the first position, there is no suction and in the second position there is a suction or vacuum when the cavity 70 is created.

Desirably, the lever 212 is fixed in either the first or the second position until manually moved to the other position. As shown in FIG. 8, the lifting mechanism 210 may include a cam 220 operatively connected to the bottom surface 202 such that rotation of the lever 212 causes the cam 220 and thus the bottom surface 202 to move toward the top surface 200 and thereby create a cavity 70.

Figure 10:
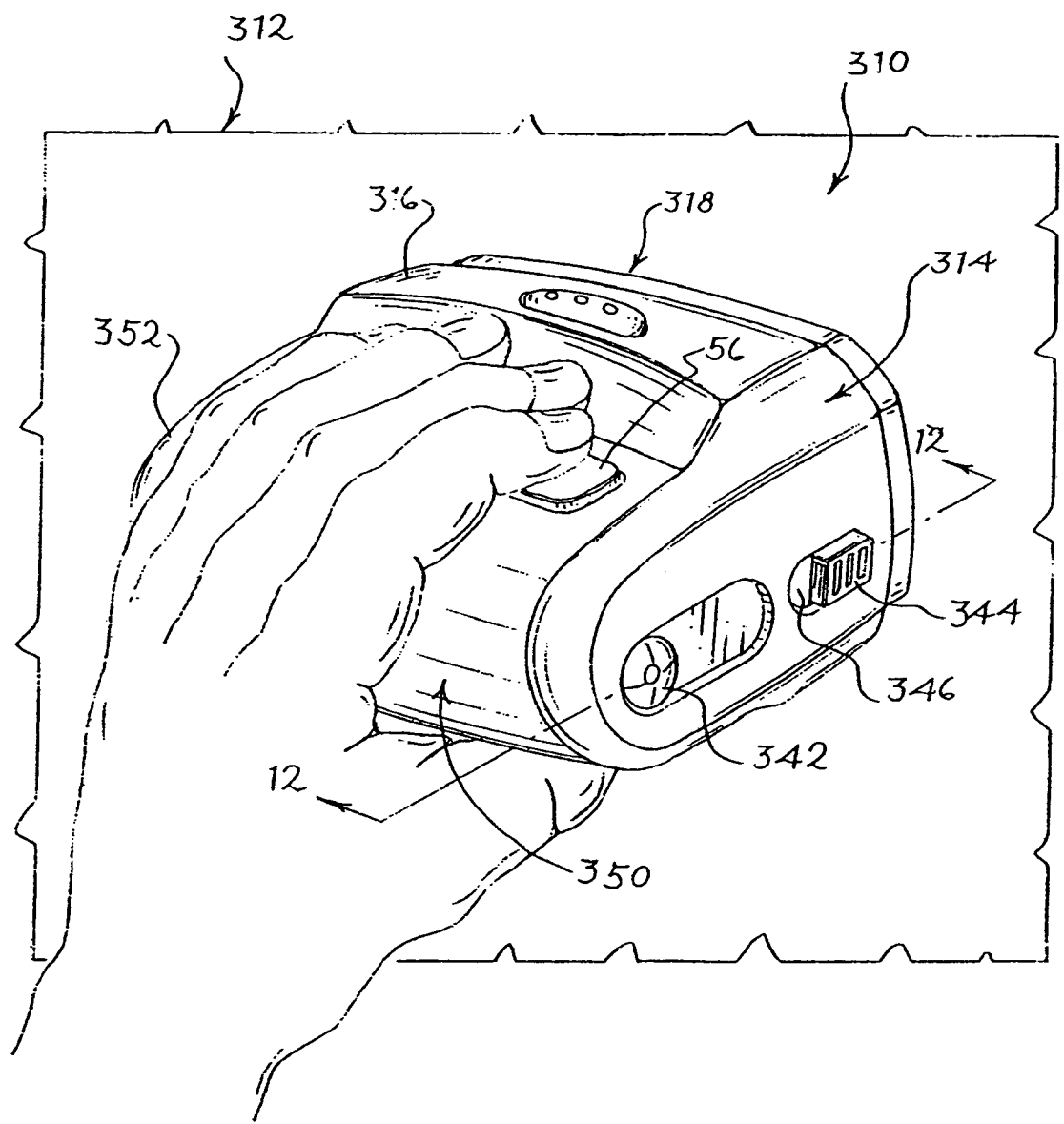
FIG. 10 illustrates a laser leveling device incorporating a vacuum mounting arrangement in accordance with the present invention.
Figure 11:
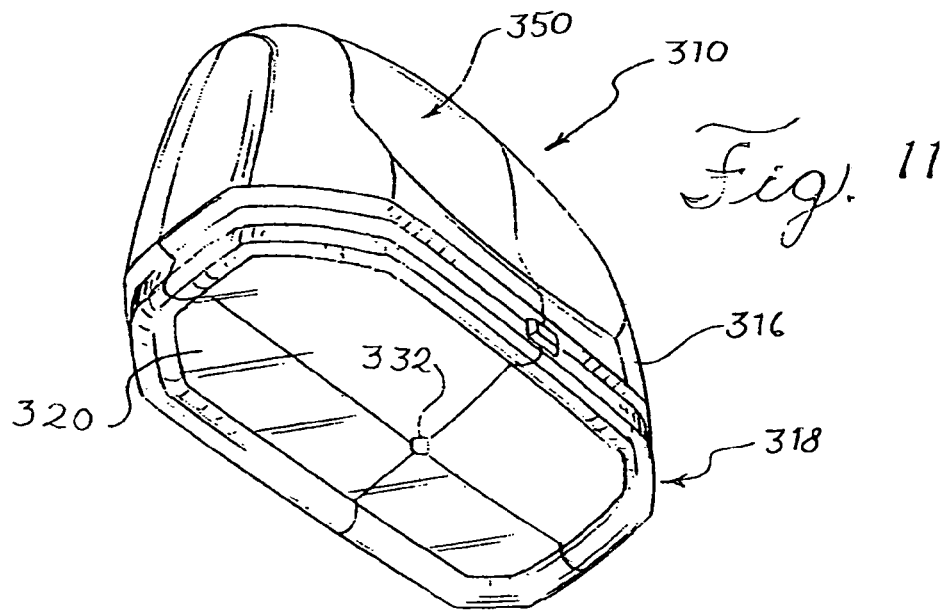
FIG. 11 is a bottom perspective view of the laser level of the present invention.
Figure 12:
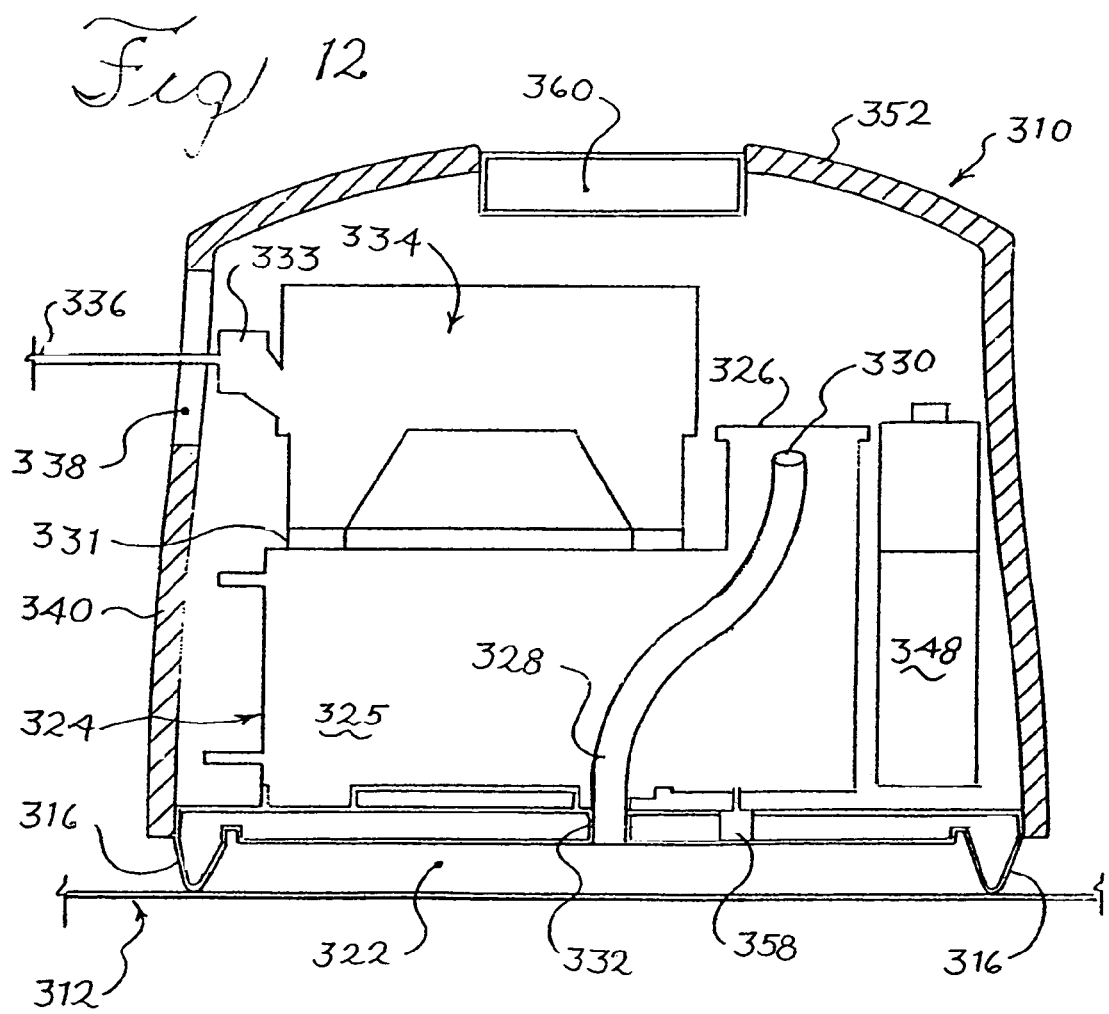
FIG. 12 is a side elevation cross-sectional view of the laser leveling device incorporating one aspect of a suction mounting arrangement along line 12-12 of FIG. 10.
Figure 14:
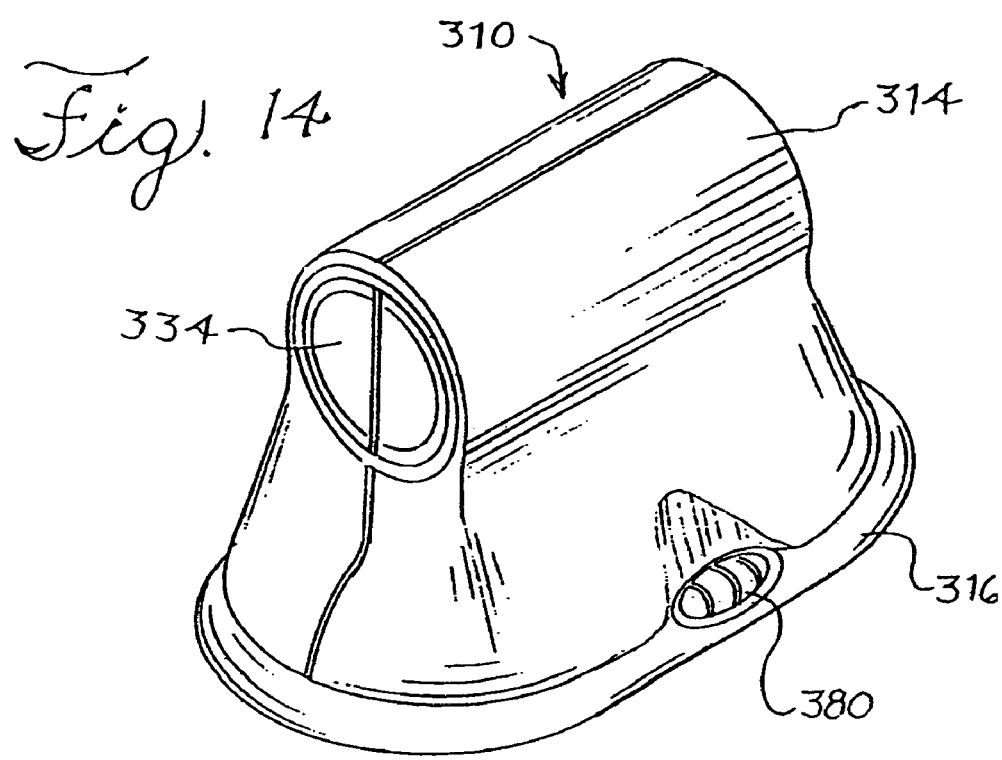
FIG. 14 is a perspective view of the second aspect of the suction mounting arrangement of the laser leveling device of the present invention.
Figure 15:
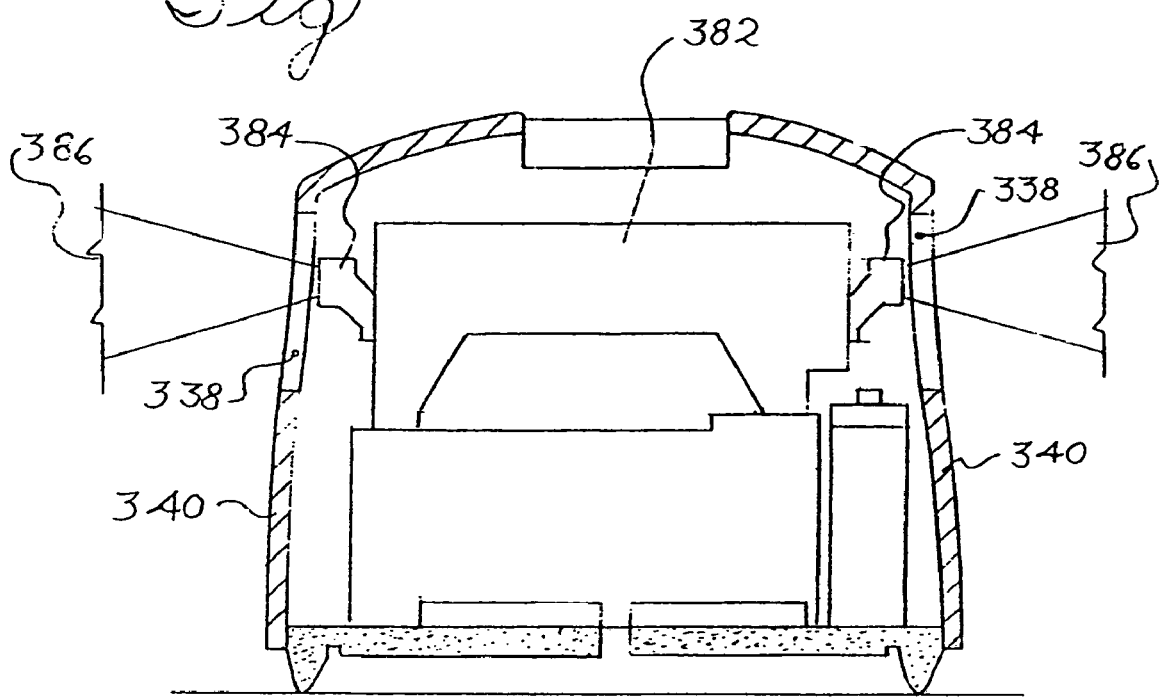
FIG. 15 is a cross-sectional view illustrating another aspect of the laser level generator of the laser leveling device of the present invention.
Figure 16:
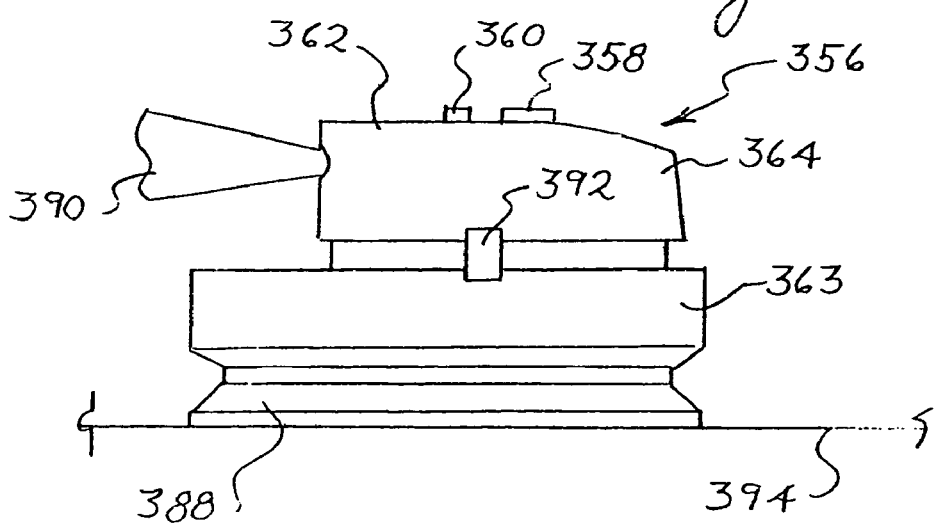
FIG. 16 is a side plan view illustrating a second embodiment of the laser leveling device of the present invention.
Figure 20:
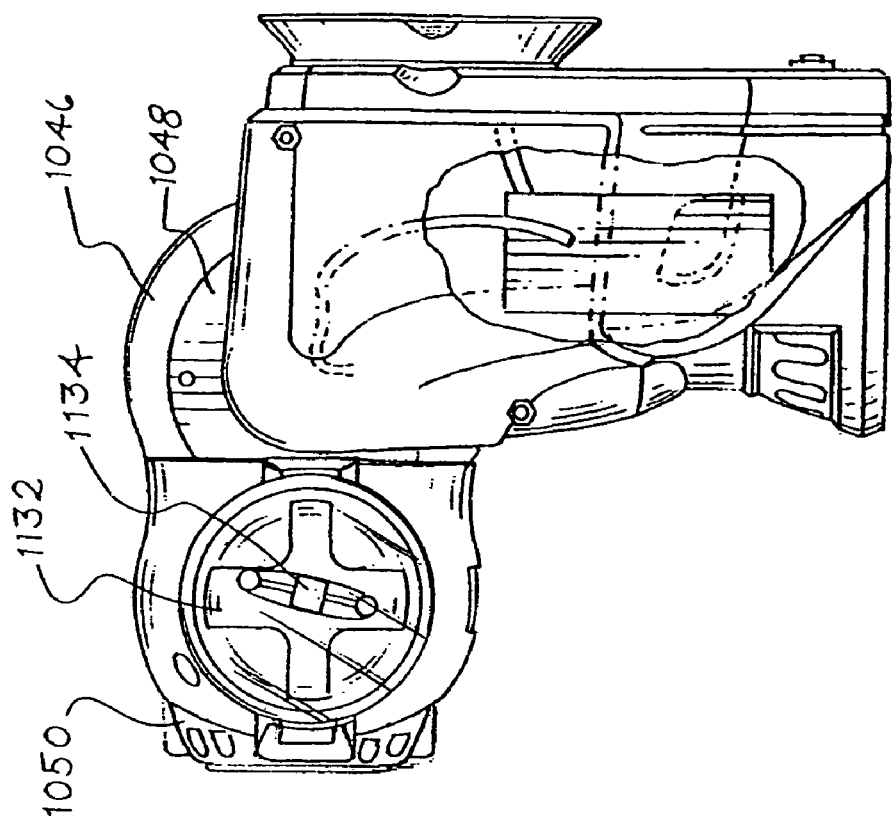
FIG. 20 is a side view of the tool assembly of FIG. 18 with internal details being visible.
Figure 19:
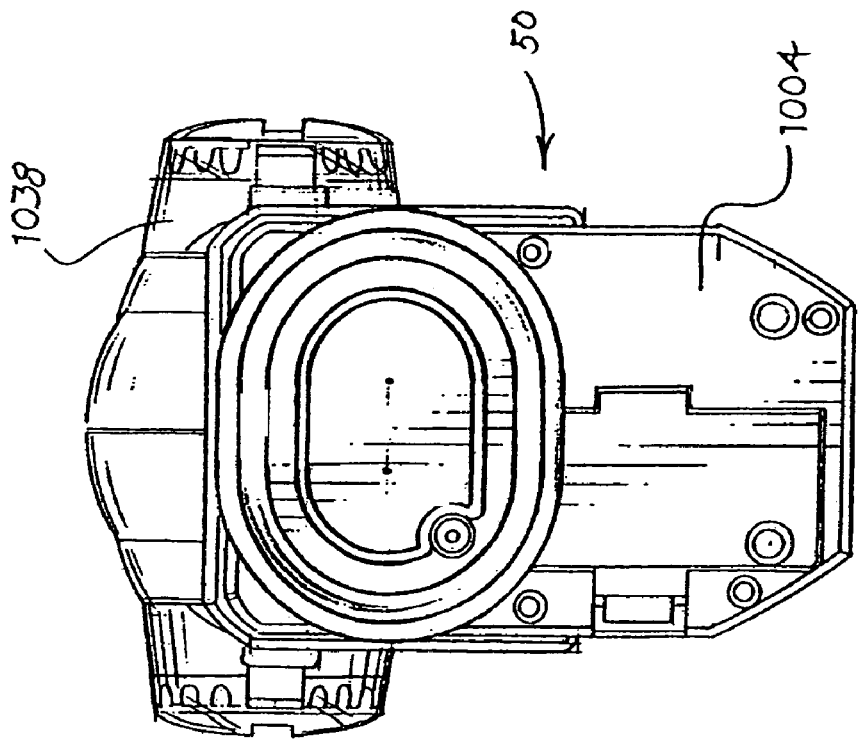
FIG. 19 is a rear view of the tool assembly of FIG. 17.
Figure 21:
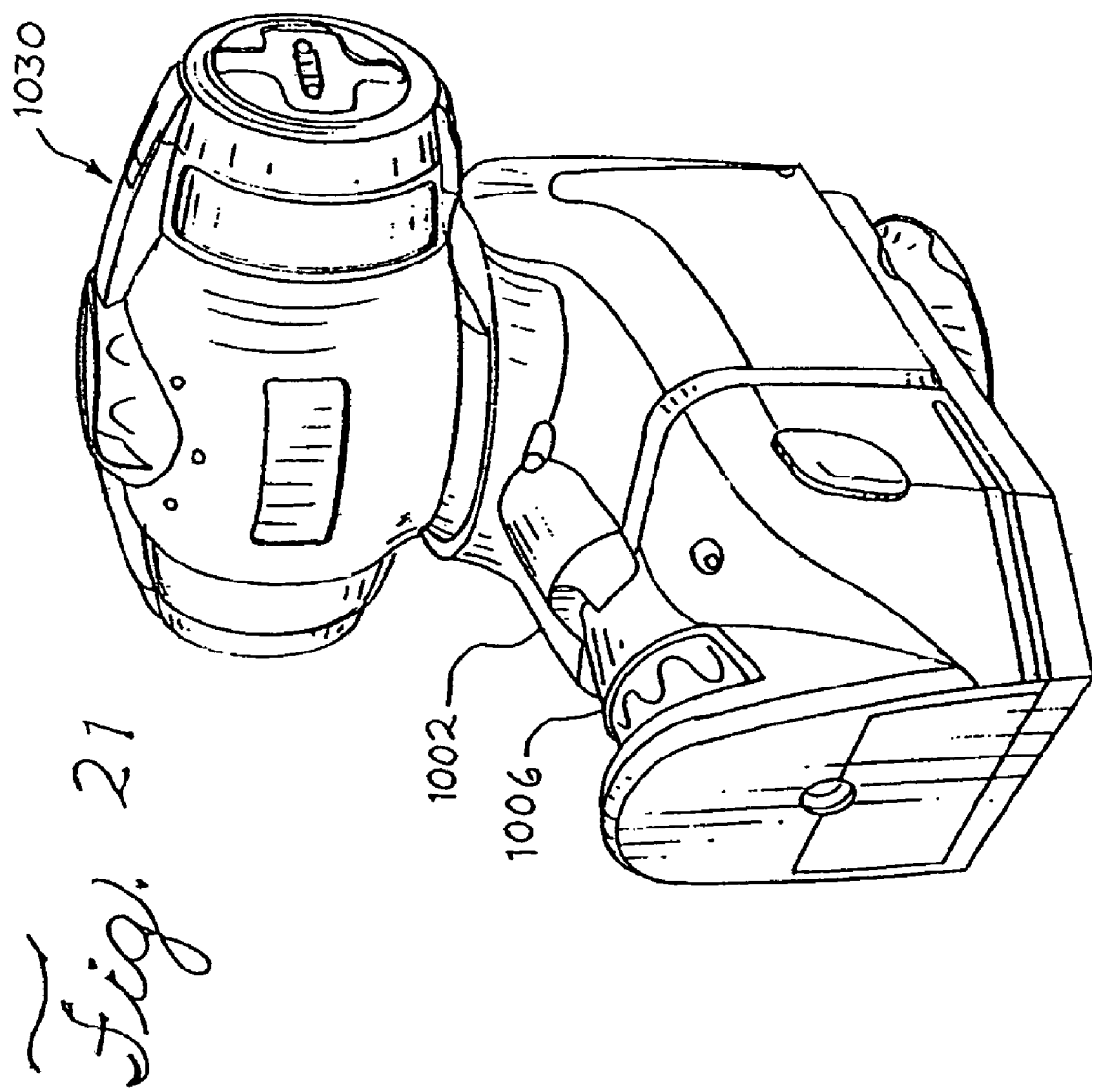
FIG. 21 is a perspective view of the tool assembly of FIG. 17 in one position and with internal details being visible.

Turning now to FIGS. 10-16, the tool assembly of the present invention provides a laser leveling device 310 having a suction mounting arrangement for securing the device 310 to an attachment surface 312. The laser level 310 includes a housing 314 having a suction cup or mounting seal 316 provided on a lower portion 318 of the housing 314. FIGS. 10-12 illustrate a single piece housing 314. It is understood that a two-piece housing as illustrated in FIG. 16 may also be used to accomplish the same objective. A cavity 320 is formed in the lower portion 318 of housing 314. The suction cup or mounting seal 316 is preferably a rubber seal that extends from a lower portion of the housing 314 about the cavity 320. Other elastomeric materials may be used to accomplish the objective of being deformable to provide a seal. The suction cup 316 cooperates with the attachment surface 312 and the cavity 320 in the housing 314 to define a suction mounting area 322 therebetween.

Referring now to FIG. 12, a first aspect of a suction mounting arrangement cooperating with the laser leveling device 310 in accordance with the present invention is disclosed. The laser level 310 includes a vacuum generating mechanism 324 that cooperates with a mounting seal 316 to create a vacuum in the suction mounting area 322. The vacuum generating mechanism includes a motor 325 disposed within the laser level housing 314. A vacuum pump 326 operatively connected to the motor 325 is mounted adjacent the motor 325 in the housing 314. It is also understood that the motor 325 and the pump 326 may be assembled as a single unit. A hose 328 connects an inlet 330 on the pump 326 to an aperture 332 of the cavity 320. The pump 326 cooperates with the mounting seal 316 to create a vacuum between attachment surface 312 and cavity 320 to mount the laser level 310 in a fixed relationship relative to attachment surface 312.

A laser light source 334 for generating an alignment beam 336 is mounted within housing. The laser light source 334 is rotatably mounted to either an inner wall of the housing or a pivot 331 mounted on the vacuum generating mechanism 324 to allow a user to adjust the position of the laser light source 334 once laser level housing 314 is secured to the attachment surface 312. The laser light source 334 may also be mounted to an inner wall of the laser level housing or fixedly mounted to a portion of vacuum generating mechanism.

The laser light source 334 includes at least one diode 333 that projects an alignment beam 336 through an opening 338 in an end wall 340 of the laser level housing 314. In one aspect of the present invention, a lens 342 is provided in the opening 338 that cooperates with at least one diode 333 to focus an alignment beam 336. It is understood that the alignment beam 336 may project through a standard opening in the housing 314 to denote a reference plane along the attachment surface 312.

A laser light source activation switch 344 extends through an elongate channel 346 of the housing 314. A power source 348 disposed in laser level housing 314 powers both the motor 325 and the laser light source 334. In one aspect of the present invention, the power source 348 is a rechargeable battery pack, such as a lithium ion or nickel cadmium power cell securely mounted within housing 314. Alternatively, the power source 348 is a removable alkaline battery.

Referring now to FIGS. 10 and 12, the laser level 310 includes a handle portion 350 formed into a top surface 352 of the housing 314. One or more bubble levels 354 extend along the top portion 352 of the laser level housing 314. Bubble levels 354 assist the operator in positioning the laser level 310 on the attachment surface 312 to ensure that alignment beam 336 projects across surface 312 at the desired angle. In one aspect of the invention shown in FIG. 12, a single bubble level 354 displays the alignment position of the level 310 of surface 312. In another aspect of the laser leveling device 356 shown in FIG. 16, a pair of bubble levels 358, 360 are provided on the top portion 362 of laser level housing 364 to provide both horizontal and vertical alignment information to the operator prior to securement of the laser level 356 to surface 312.

One aspect of the suction mounting arrangement of laser leveling device includes a pump actuation switch 366 that may be provided adjacent handle 350 and is operatively connected to the pump 326. The user actuates switch 366 when the mounting seal 316 is placed in contact with attachment surface 312, allowing the pump 326 to evacuate air from the suction mounting area 322 created between the attachment surface 312, the seal 316 and the cavity 320 through the aperture 332.

A sensor 368 provided proximate the cavity 320 monitors the pressure in the suction mounting area 322. The sensor 368 activates the pump 326 to remove air from the suction mounting area 322 when the sensor detects a loss of vacuum pressure in the area 322 between the mounting seal 316 and the attachment surface 312. Loss of vacuum pressure in the suction mounting area 322 may be caused by imperfections in the attachment surface 312, such as gaps or cracks that limit the effectiveness of mounting seal 316. The sensor 368 allows the pump 326 to compensate for the surface flaws to ensure a proper seal between the laser level 310 and the attachment surface 312.

Figure 13:
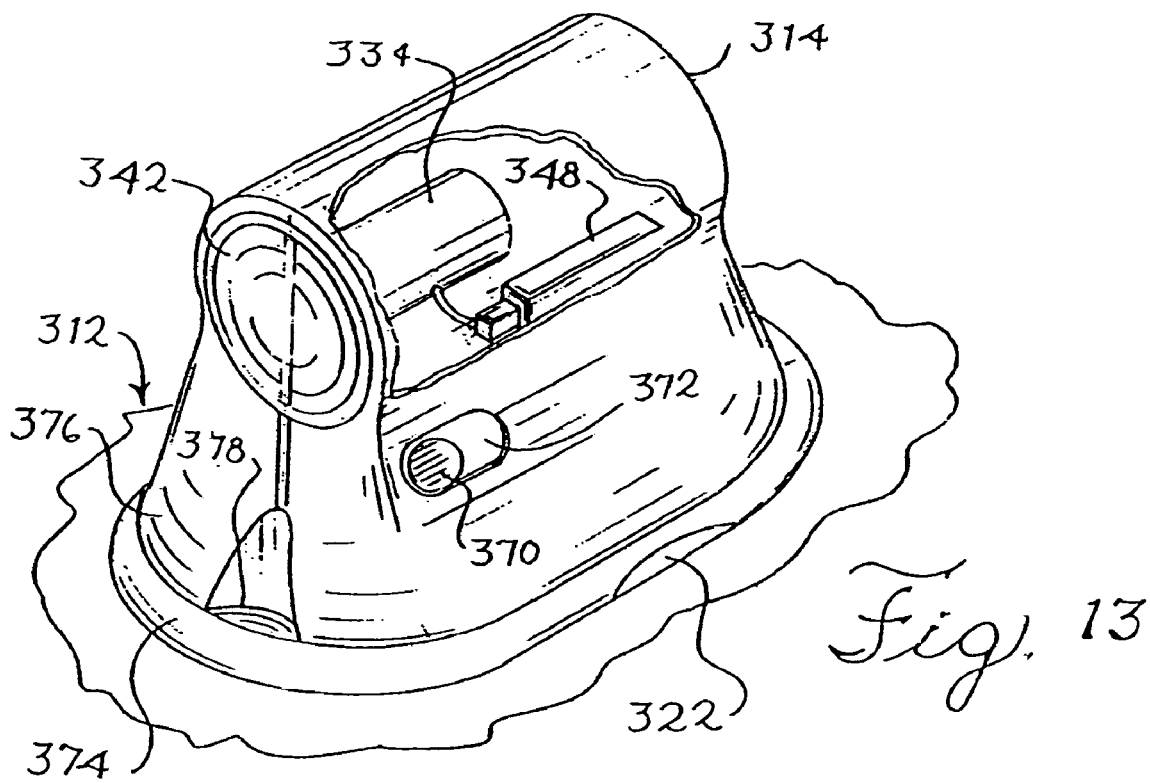
FIG. 13 is a fragmentary perspective illustrating a second aspect of the suction mounting arrangement of the laser leveling device of the present invention.

Referring now to FIGS. 13 and 14, a second aspect of the suction mounting arrangement cooperating with the laser leveling device 310 of the present invention. The laser light source 334 is rotatably mounted to an inner wall of the laser level housing 314 to allow a user to adjust the position of the laser light source 334 once the laser level housing 314 is secured to an attachment surface 312 and to project an alignment beam through the lens 342 onto a surface.

A laser light source activation switch 370 extends through an elongate channel 372 of the housing 314. A power source 348 disposed in the laser level housing 314 powers laser light source 334. A suction cup or mounting seal 374 extends from a lower portion 376 of laser level housing 314. It is understood that the suction cup 374 can be formed in a variety of geometries to accommodate various housing shapes. The mounting seal 374 cooperates with the attachment surface 312 to define a suction mounting area 322 therebetween.

A pump 378 is operatively connected to an aperture (not shown) in the lower portion 376 of housing 314. The pump 378 cooperates with the mounting seal 374 to create a vacuum between the attachment surface 312 and the lower portion 376 of laser level housing 314 to create a suction mounting area 322. A pump actuation switch 380 is operatively connected to the pump 378 adjacent the lower portion 376 of the housing 314 and the mounting seal 374. A user actuates the switch 380 after the mounting seal 374 is placed in contact with the attachment surface 312, allowing the pump 378 to evacuate air from the suction mounting area 322 if the user detects a loss of vacuum pressure in the area 322. It is understood that the switch 380 may be provided in either a vertical or horizontal orientation on the laser level housing 314.

FIG. 15 illustrates another type of laser light source incorporated in the laser leveling device 310 of the present invention. The laser level 310 includes a laser light source 382 having a pair of diodes 384 in a coplanar relationship that project alignment beams 386 through openings 338 in the end walls 340 of the laser level housing 314. It is also contemplated that laser light source may include a first diode which projects a first alignment beam through a first opening in the end or side wall of the housing and a second diode projecting a second alignment beam generally perpendicular to the first alignment beam through a second opening in an end or side wall of the housing.

Referring now to FIG. 16, a second embodiment of a laser leveling device having a vacuum mounting arrangement of the present invention is disclosed. The laser level 356 comprises a lower housing 363 having a rubber mounting seal 388 extending from a lower portion of housing 363 and a pivotally mounted upper housing 364 enclosing a laser light source generating an alignment beam 390. The upper housing 364 pivots relative to the lower housing 363 about a mount 392. The mount 392 includes detents (not shown) that allow a user to position the upper housing 364 at discrete angular increments, for example, 15° angle increments, relative to the lower housing 363, thereby allowing a user to rapidly reposition the laser light source in the upper housing 364 when the laser level 356 is secured to the attachment surface 394.

It is to be understood that any of the assemblies shown in FIGS. 10-16 and described above can be provided with a manual suction mounting arrangement as shown in FIGS. 7-9 and described above. For example, the housing 14, 314 can be provided with a mounting seal 16 as described above with other alternative embodiments. The mounting seal 16 is provided with a top surface 200, a bottom surface 202 and a wall 204 extending from the top surface 200 to contact the attachment surface 12 and form a seal, as will be described below.

A lifting mechanism 210 provided on the top surface 200 of the mounting seal cooperates with the bottom surface 202 such that actuation of the lifting mechanism 210 lifts the bottom surface 202 to create a cavity 20. The lifting mechanism 210 can be provided with a lever 212 that extends from a portion of the housing 14 such that movement of the lever 212 actuates the lifting mechanism 210. As shown in FIGS. 8-10, the lever 212 is rotated from a first position to a second position (counter clockwise direction) such that in the first position, there is no suction and in the second position there is a suction or vacuum when the cavity 20 is created.

Desirably, the lever 212 is fixed in either the first or the second position until manually moved to the other position. As shown in FIG. 9, the lifting mechanism 210 may include a cam 220 operatively connected to the bottom surface 202 such that rotation of the lever 212 causes the cam 220 and thus the bottom surface 202 to move toward the top surface 200 and thereby create a cavity 20.

Turning now to FIGS. 17-21, another embodiment of the inventive modular assembly described above. In this embodiment, the tool attachment is a laser light generator that is self-leveling to provide a desired horizontal or vertical line. Other advantages and features will become apparent from the following description.

The embodiment shown in FIGS. 17-21 has a base 12 upon which a self-leveling laser generator housing 1030 is mounted. The base 12 includes a vacuum generating mechanism for securing the base 12 as described above. The base may be formed from three sections: a top 1002, a bottom 1004, and a rear 1006. A longitudinal axis 1008 of the base extends through the top 1002 to the bottom 1004.

The top of the base 1002 may be slidably moveable with respect to the bottom 1004 to adjust the height of the generator housing 1030 with respect to the bottom 1004. A rotating member 1010 is provided in the bottom 1004 accessible to the user to allow the user to move the rotating member 1010 to cause the top 1002 to move up or down with respect to the bottom 1004. As seen in FIG. 18, the rotating member 1010 is connected to a screw 1012 upon which the top of the housing 1004 is mounted such that rotation of the rotating member 1010 causes the top 1004 to move up or down depending on the direction that the rotating member 1010 is rotated.

As noted above the self leveling laser generator housing 1030 is mounted to the top 1002 of the base. FIG. 17 shows the generator housing 1030 in an upright position. In this position, when the base 12 is mounted to a surface such as a wall, the longitudinal axis 1032 of the generator housing 1030 is parallel to the plane of the wall (perpendicular to the longitudinal axis 1008 of the base). When the generator housing 1030 is in this position, it can be rotated relative to the base 12 such that the generator housing longitudinal axis 1032 will be perpendicular to the surface upon which the base 12 is mounted with the vacuum generating mechanism 50 (as well as being perpendicular to the longitudinal axis of the base). The generator housing 1030 can also be pivoted forwardly with respect to the base 12 so that the generator housing 1030 has a position as shown in FIG. 18. While in this position, the generator housing 1030 can be rotated such that the longitudinal axis 1032 of the generator housing is parallel to the longitudinal axis 1008 of the base 12.

The laser generator housing 1030 has a top 1034, front 1036, rear 1038, two side ends 1040, 1042, and bottom 1044 that is rotatably connected to a pivoting member 1046 having a sphere-like structure with its sides and top truncated to fit the base 12 and generator housing 1030 respectively. The pivoting member 1046 is movably secured to the top of the base 1002 to permit the laser generator housing 1030 to pivot with respect to the base 12 as described above. The generator housing 1030 is selectively pivotable with respect to the base 12 to many different positions due to the frictional fit between the laser generator housing 1030 and the base 12. Alternatively or in conjunction with the frictional fit, the pivoting member 46 or a portion of the top 1034 of the base may be provided with a detent arrangement 1048 at selected positions to provide a plurality of positive stops when the laser generator housing 1030 is pivoted to a selected location.

Figure 23:
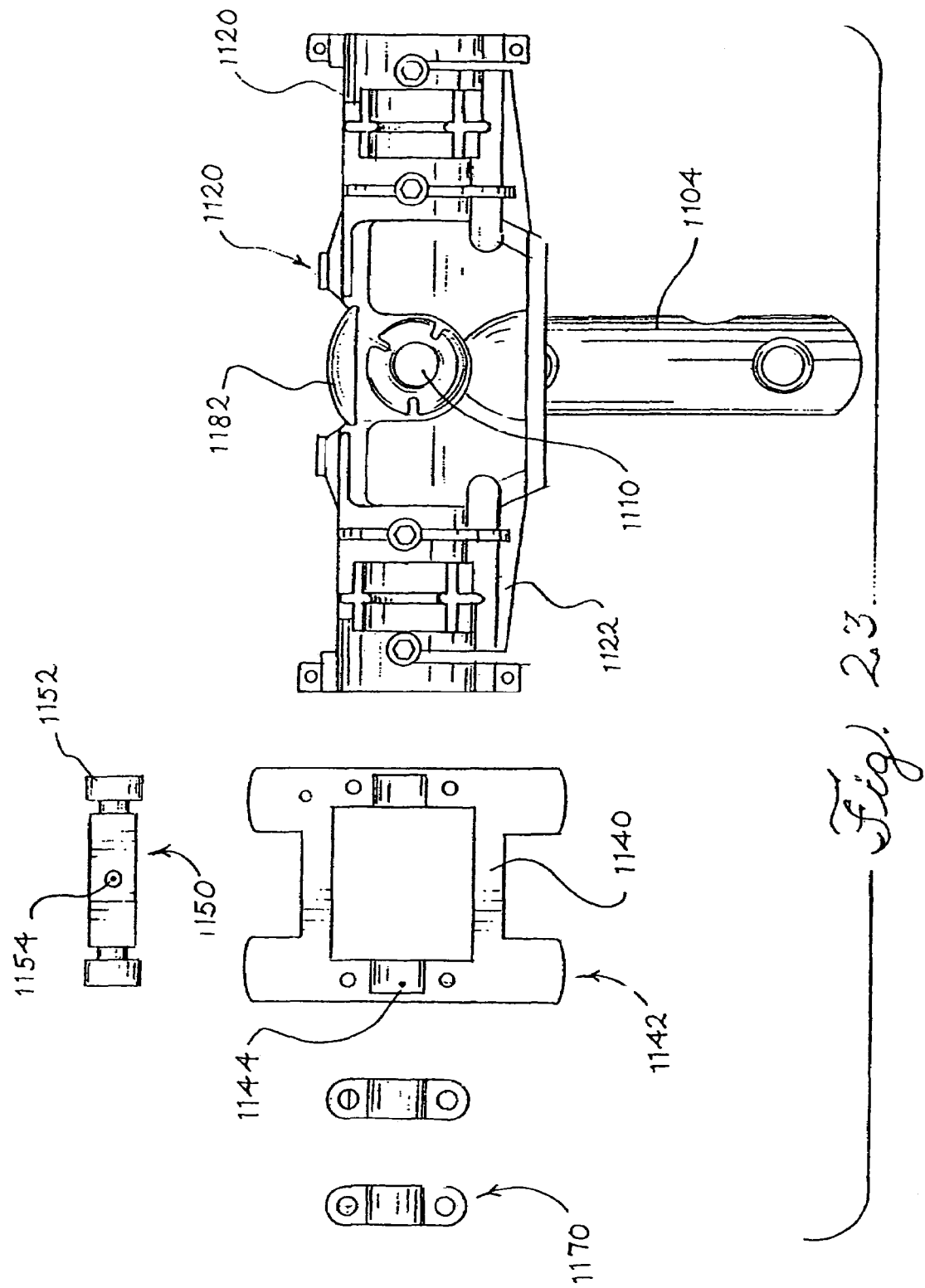
FIG. 23 shows several parts of the self-leveling mechanism of FIG. 22.
Figure 24:
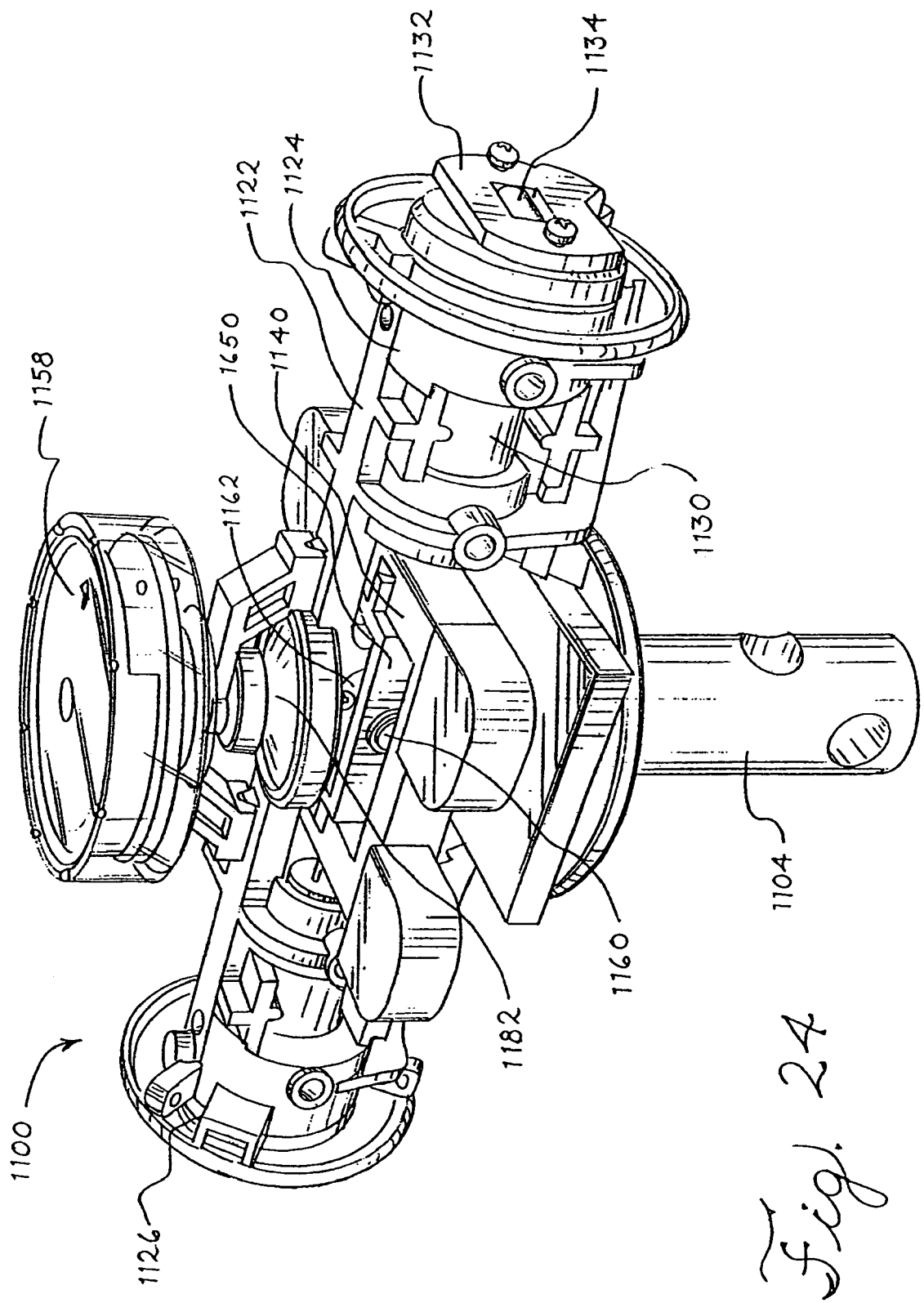
FIG. 24 shows the self-leveling mechanism of FIG. 22.

As will be appreciated from the description below, the self-leveling feature of this embodiment is effective when the laser generator housing 1030 is in an upright position, as shown in FIG. 17. In that regard, one embodiment of the self-leveling aspect is shown in FIGS. 22-24.

Figure 22:
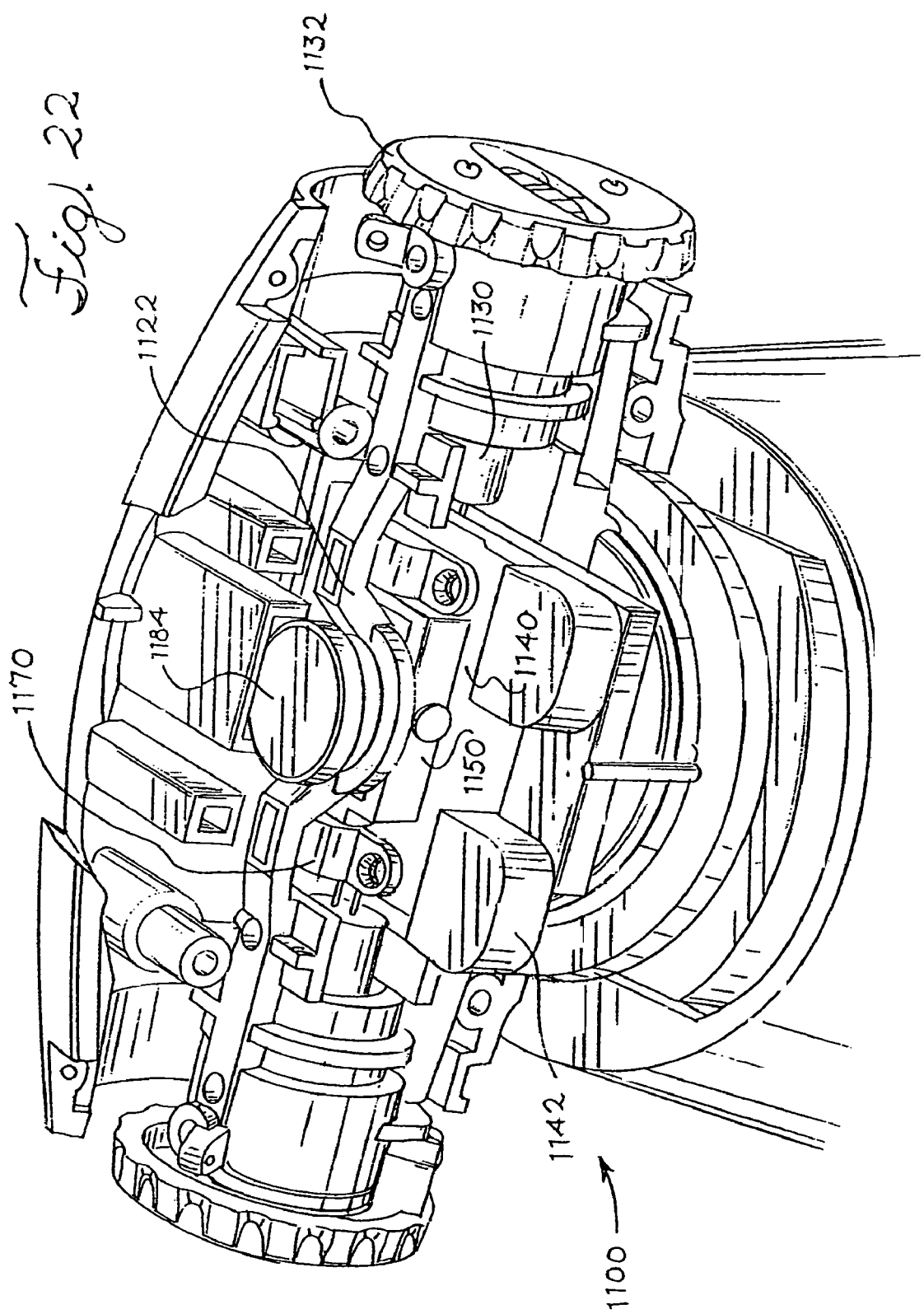
FIG. 22 is a cut-away portion of the laser generator housing of FIG. 17 to show details of the self-leveling mechanism according to one embodiment of the present invention.

FIG. 22 shows a cut-away portion of the laser generator housing 1030 from which it can be seen that the self-leveling mechanism 1100 includes a frame 1102, a rocking block seat 1140, a bearing rocking block 1150, and bearing straps 1170. The frame 1108 is in the shape of a T, where the vertical portion or shaft 1104 acts as the arm of a pendulum. To provide quicker self-leveling, the distal end of the vertical portion 1104 of the frame may act as a counterweight 1106 or may be provided with a counterweight (not shown).

The horizontal portion 1120 of the frame 1102 defines arms 1122 that are configured to hold a laser diode 1130 such that the light projected from each extends in a direction opposite from the other. The distal ends of the arms 1124, 1126 may also support a lens holder 1132 that supports a lens 1134 through which the laser light emitted from the diode 1130 passes. Desirably, each lens 1134 is rotatable with respect to the diode 1130 so that the emitted beam can be adjusted to a variety of different directions such as horizontal, vertical, or positions between horizontal and vertical. The lens holder 1132 may be provided with indications so that the movement in a particular direction can be indicated. For example, the indications may provide an indication of angular movement in degrees such as 5 degrees, etc.

Because each arm 1122 may support a laser diode 1130, the projected beam may differ from one end to the other. For example, the projected beam may be horizontal at one end and vertical at the other end. Alternatively, both may be horizontal or vertical.

It is contemplated that each arm 1122 can support two laser diodes so that a plurality of patterns can be generated on the surface upon which the laser light contacts. When two laser diodes are supported on each arm, it is desirable to provide a lens through which the light emitted from each diode passes. The lens may alter the beam emitted from the laser diode so that the light projected from the housing can be in the form of + or other pattern.

The laser diodes 1130 are powered from an electrical source that may be the same as or different from the power source used for the vacuum generating mechanism 50. In one embodiment, the laser diodes 1130 are powered from a source that can be actuated at the same time the motor for the vacuum generating mechanism 50 is actuated. In another embodiment, a separate switch 1050 is provided so that the laser diodes 1130 can be powered while the vacuum generating mechanism 50 is not operating. In this instance, a switch 1050 may be provided on the top of the laser generator housing 1034, as shown in FIG. 18. The switch 1050 may have more than one position. For example, the switch 1050 may have an off position 1052, where no power is provided to the laser diodes 1130. In this position, it is desirable to lock-out the self-leveling mechanism 1100 to protect the self-leveling mechanism 1100.

The switch 1050 may have a self-leveling position 1054, where the self-leveling mechanism 1100 is activated and the laser diodes 1130 are powered. The switch 1050 may also have an angle finder position 1056, in which it is contemplated that, after the laser diodes 1130 have been self-leveled, the switch can be moved to an angle finder position 1056 after which the laser generator housing 1030 may be pivoted or rotated relative to the base 12 to a selected angle that is indicated on a compass indicator 1058 provided on the face of the switch 1050. For example, if the user wishes to project a line 30° from the horizontal, the base 12 may be releasably mounted to a substantially vertical surface such as a wall and held in place by the vacuum generating mechanism 50; then the switch 1050 may be positioned to the self-leveling position 1054 so that the projected beam projects a line or other pattern at the "true" horizontal. The switch 1050 can then be moved to the angle finder position 1056, in which the self-leveling mechanism 1100 is locked and the angle finder feature sets the reference angle to 0°. The laser generator housing 1030 can then be pivoted or rotated with respect to the base 12 until the compass indicator 1058 indicates the desired angular location, e.g., 30°.

Referring back to FIGS. 22-24, the self-leveling mechanism 1100 includes a rocking block seat 1140 that is connected to the laser generator housing 1030 so that the rocking block seat 1140 is fixed with respect to the laser generator housing 1030. The rocking block seat 1140 is shown as a plate like structure, with ends 1142 that contact the laser generator housing 1030 to ensure that the rocking block seat 1140 will remain stationary with respect to the laser generator housing 1030. The ends 1142 of the rocking block seat 1140 may be provided with pliable or elastic material to ensure a tight fit with the housing 1130 and at the same time provide cushioning. Of course, any suitable shape may be used so that the rocking block seat 1140 will provide a stationary structure to provide bearing faces 1144, as described below.

The rocking block seat 1140 has a pair of bearing faces 1144 to receive bearings 1152 formed on the ends of a bearing rocking block 1150. The bearing rocking block 1150 is rotatably secured to the rocking block seat 1140 by a pair of bearing straps 1170 that form a bearing face for the bearings 1152 on the ends of the bearing rocking block 1150. The bearing rocking block 1150 has a shaft aperture 1154 to receive one end of a shaft 1160 in a non-rotatable manner. The other end of the shaft carries a bearing 1162 that is rotatably received in a shaft hole 1110 provided on the frame 1102.

One skilled in the art will appreciate that by providing rotatable bearings that are perpendicular to each other the arms 1122 of laser generator, and thus, the laser diodes 1130 will be self-leveling in two directions. The first direction allows the arms 1122 of the frame 1102 to assume a horizontal position so that a horizontal beam can be projected. In other words, the distal ends 1124, 1126 of the arms 1122 can move vertically (up and down, i.e., toggle) to assume a horizontal position. The second direction allows the arms 1122 to rotate about a pivot from the front 1036 of the laser generator housing to the rear 1038 of the laser generator housing. In other words, the second direction is perpendicular to the first direction. Of course, it is understood that one of the directions of self-leveling can be omitted to provide a simpler mechanism.

Desirably, a damping mechanism 1180 is provided at the top of the frame 1102 to assist the self-leveling mechanism 1100. In this regard, non-ferrous material 1182 is provided on a top portion of the frame 1102 opposite a magnet 1184 so that the non-ferrous portion 1182 is maintained at a certain distance from the magnet 1184.

Figure 25:
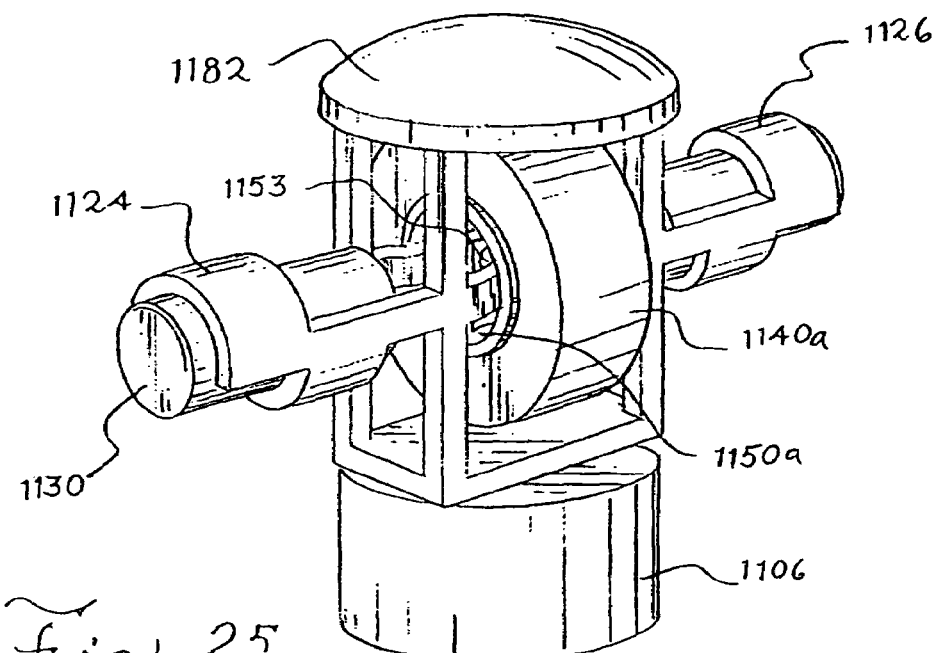
FIG. 25 shows another embodiment of a self-leveling mechanism that can be used in the laser generator housing.
Figure 26:
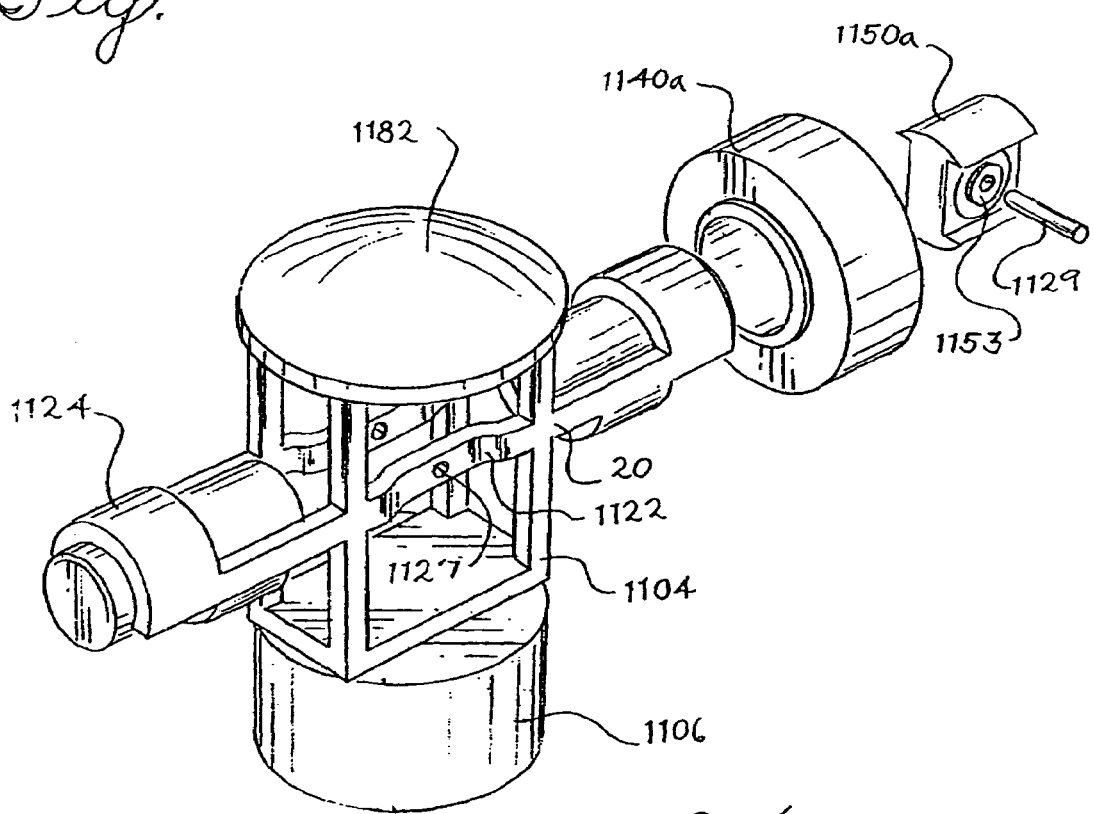
FIG. 26 shows the self-leveling mechanism of FIG. 25 with certain features shown in exploded view.
Figure 27:
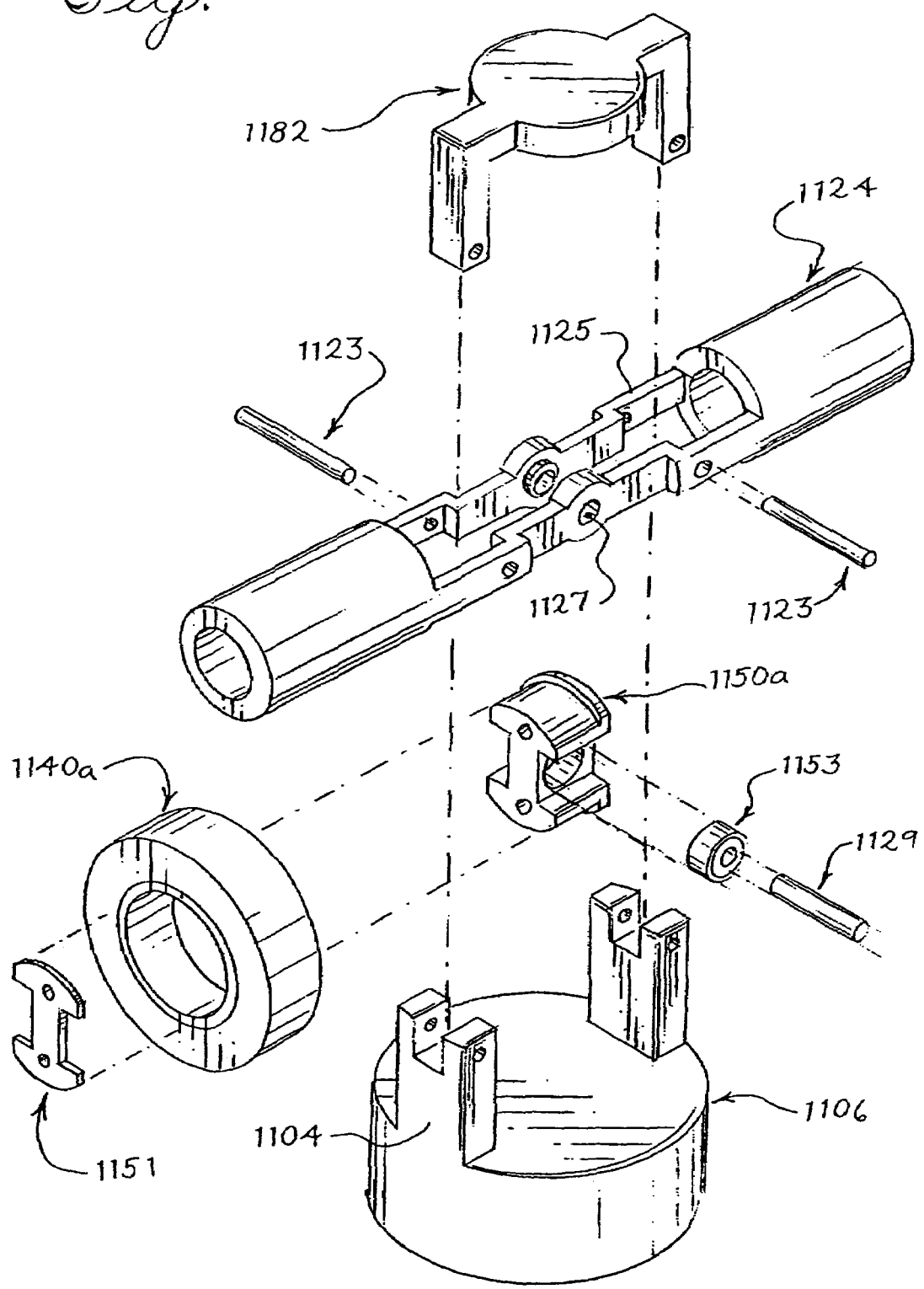
FIG. 27 is another embodiment of a self-leveling mechanism.

Another embodiment of the self-leveling mechanism 1100 is illustrated in FIGS. 25-27. In this embodiment, a frame 1102 is provided with a damping dome 1182, a counterweight 1106, and two arms 1122 extending outward from the frame. The distal ends 1124, 1126 of the arms define a housing to carry a laser diode 1130. The frame may be a single piece or, as shown in FIG. 27 made from several pieces. In the embodiment shown in FIG. 27, the horizontal portion 1120 of the frame 1102 includes the distal ends 1124 connected to proximal ends 1125 by a pin 1123.

The proximal ends 1125 of the arms have an aperture 1127 to receive a bearing pin 1129, on which a rocking bearing 1153 is rotatably mounted. The rocking bearing 1153a is mounted within a rocking bearing block 1150a in the form of a truncated cylinder, which in turn is mounted within a rocking block seat 1140a, which is in the form of a cylindrical bearing. In particular, the rocking bearing block 1150a is mounted in the inner annulus 1141 of the rocking block seat 1140a and may be secured by a plate 1151. The rocking block seat 1140a is positioned such that the frame 1102 is capable of rotating with respect to the rocking block seat 1140a. For instance, the rocking block seat 1140a may be held in a fixed position by or within the laser generator housing 1030. Because the bearing pin 1129 is connected to the frame 1102 through the aperture 1127 at the proximal ends of the arms 1122, the frame 1102 is able to pivot in a first direction. At the same time, because the rocking bearing 1153a is able to move within the rocking bearing block 1150a, the frame 1102 is able to pivot in a second direction perpendicular to the first direction.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A structure mountable assembly comprising:
   a. a base housing including a mounting seal extending from a portion of the housing, and a vacuum generating mechanism disposed within the housing and including a pump;
   b. a second housing connected to the base and rotatable with respect to the base; and,
   c. at least one light source disposed within the second housing wherein the light source projects light on a lens that emits a planar beam of light and wherein the lens is rotatable with respect to the light source to change an orientation of the planar beam of light.

2. The assembly of claim 1 wherein the second housing is rotatable with respect to the base housing in discrete angular increments.

3. The assembly of claim 1 wherein the emitted planar beam of light is projected on an attachment surface to which the mounting seal is connected, wherein the beam is at a selected angle between 0° and 360°.

4. The assembly of claim 1 wherein the emitted beam of light is in the shape of a cross.

* * * * *